United States Patent
Moghaddam et al.

(10) Patent No.: US 12,503,483 B2
(45) Date of Patent: *Dec. 23, 2025

(54) GEMCITABINE AMPHIPHILE PRODRUGS

(71) Applicant: NANOMED HOLDINGS PTY LTD, Lane Cove West (AU)

(72) Inventors: Minoo Jalili Moghaddam, Lane Cove West (AU); Xiaojuan Gong, Lane Cove West (AU); Ross Cyril Smith, Lane Cove West (AU)

(73) Assignee: NANOMED HOLDINGS PTY LTD, Lane Cove West (AU)

( * ) Notice: Subject to any disclaimer, the term of this patent is extended or adjusted under 35 U.S.C. 154(b) by 1209 days.

This patent is subject to a terminal disclaimer.

(21) Appl. No.: 17/050,160

(22) PCT Filed: Apr. 24, 2019

(86) PCT No.: PCT/AU2019/050363
§ 371 (c)(1),
(2) Date: Oct. 23, 2020

(87) PCT Pub. No.: WO2019/204869
PCT Pub. Date: Oct. 31, 2019

(65) Prior Publication Data
US 2021/0238214 A1 Aug. 5, 2021

(30) Foreign Application Priority Data
Apr. 26, 2018 (AU) ............................. 2018901386

(51) Int. Cl.
*C07H 19/06* (2006.01)
*A61K 47/60* (2017.01)
*A61P 35/00* (2006.01)

(52) U.S. Cl.
CPC ............. *C07H 19/06* (2013.01); *A61K 47/60* (2017.08); *A61P 35/00* (2018.01)

(58) Field of Classification Search
None
See application file for complete search history.

(56) References Cited

U.S. PATENT DOCUMENTS

| | | | |
|---|---|---|---|
| 8,603,999 B2 * | 12/2013 | Drummond | A61K 9/107 536/28.4 |
| 8,653,048 B2 | 2/2014 | Xue et al. | |
| 2008/0090803 A1 | 4/2008 | Swindell et al. | |
| 2009/0130214 A1 | 5/2009 | Couvreur et al. | |
| 2010/0160249 A1 | 6/2010 | Couvreur et al. | |
| 2012/0088908 A1 | 4/2012 | Xue et al. | |
| 2014/0134160 A1 | 5/2014 | Wu | |
| 2015/0132298 A1 | 5/2015 | Wu | |
| 2017/0112800 A1 | 4/2017 | Roy et al. | |
| 2017/0355726 A1 | 12/2017 | Yang et al. | |

FOREIGN PATENT DOCUMENTS

| | | | | |
|---|---|---|---|---|
| AU | 2005316922 A1 | 6/2006 | | |
| AU | 2005316922 B2 | 8/2011 | | |
| CN | 101061131 A | 10/2007 | | |
| CN | 102428093 A | 4/2012 | | |
| CN | 104968353 A | 10/2015 | | |
| CN | 106117561 A | 11/2016 | | |
| CN | 106470681 A | 3/2017 | | |
| EP | 1761551 A1 | 3/2007 | | |
| JP | 2004529125 A | 9/2004 | | |
| JP | 2016-503414 A | 2/2016 | | |
| WO | WO 1998/32762 | * | 7/1998 | ........... C07H 19/073 |
| WO | 2004041203 A2 | 5/2004 | | |
| WO | WO 2004/041203 | * | 5/2004 | |
| WO | 2006090029 A1 | 8/2006 | | |
| WO | 2010063080 A1 | 6/2010 | | |
| WO | WO 2012/177986 | * | 12/2012 | ............. A61Q 17/00 |
| WO | 2014078295 A1 | 5/2014 | | |
| WO | 2015153345 A1 | 10/2015 | | |
| WO | 2017064657 A1 | 4/2017 | | |
| WO | 2019050850 A1 | 3/2019 | | |

OTHER PUBLICATIONS

Permamo et al (C R Chimie xxx:1-13, 2018) (Year: 2018).*
Pasut et al (J Controlled Release 127:239-248, 2008) (Year: 2008).*
Vandana et al (Biomaterials 31:9340-9356, 2010) (Year: 2010).*
Examination Report in related Australia Application No. 2019258590, mailed Jul. 25, 2022.
Notice of acceptance in related Australia Application No. 2019258590, mailed Aug. 25, 2022.
Office action in related Japan Application No. 2021-508032, mailed Aug. 30, 2022.
Office Action for China Application No. 201980042896.0, mailed Oct. 31, 2023.
Search Report for China Application No. 201980042896.0.
Madhuri Dasari et al., "H-Gemcitabine: A New Gemcitabine Prodrug for Treating Cancer," Bioconjugate Chemistry, Jan. 16, 2013, pp. 4-8, vol. 24, No. 1.
Extended Search Report in European Patent Application No. EP19792914.4, mailed Sep. 23, 2022.
Arnaud Peramo et al., "Squalene versus cholesterol: Which is the best nanocarrier for the delivery to cells of the anticancer drug gemcitabine?", Comptes Rendus Chimie, Oct. 2018, pp. 974-986, vol. 21.
Jason T. Weiss et al., "Development and Bioorthogonal Activation of Palladium-Labile Prodrugs of Gemcitabine", Journal of Medicinal Chemistry, May 2014, pp. 5395-5404, vol. 57.

(Continued)

*Primary Examiner* — Craig D Ricci
(74) *Attorney, Agent, or Firm* — Piloff Passino & Cosenza LLP; Rachel Piloff; Sean Passino

(57) ABSTRACT

The present invention relates to improved prodrugs, and compositions thereof. In particular, it relates to amphiphilic gemcitabine prodrugs or amphiphilic prodrugs of other biologically active molecules with the capacity to make liquid crystalline nanostructured nanoparticles, and uses thereof to treat animals, including humans.

18 Claims, 14 Drawing Sheets

(56) References Cited

OTHER PUBLICATIONS

Gianfranco Pasut et al., "Antitumoral activity of PEG-gemcitabine prodrugs targeted by folic acid", Journal of Controlled Release, May 2008, pp. 239-248, vol. 127.
International Search Report & Written Opinion for PCT/AU2019/050363, mailed Jul. 5, 2019.
Information Disclosure Statement Transmittal filed Oct. 23, 2020.
Office Action in related Japan Application No. 2021-508032, mailed Jan. 5, 2022.
Arnaud Peramo et al., "Squalene versus cholesterol: Which is the best nanocarrier for the delivery to cells of the anticancer drug gemcitabine?," Comptes Rendus Chimie, Mar. 2018, pp. 974-986, vol. 21.
Kathryn J. Skilling et al., "Nucleoside-Based Self-Assembling Drugs for Localized Drug Delivery," ChemMedChem, Mar. 2018, pp. 1098-1101, vol. 13, No. 11.
Examination Report in related Australia Application No. 2019258590, mailed Aug. 24, 2021.
Second Office action dated Sep. 30, 2024 in SIPO application No. CN 201980042896.0.
Notice of Reasons for Refusal dated Jun. 17, 2025 in JPO application No. JP 2024151899.
Sharon M. Sagnlla, et al., Nanostructured nanoparticles of self-assembled lipid pro-drugs as a route to improved chemotherapeutic agents. Nanoscale. Mar. 2011; 3(3):919-24. doi: 10.1039/c0nr00781a. Epub Dec. 21, 2010. PMID: 21173998.
Jerikho C. Bulandi, et al., Biomimetic Gemcitabine-Lipid Prodrug Nanoparticles for Pancreatic Cancer, ChemPlusChem May 18, 2020, vol. 85, issue 6, pp. 1283-1291 (DOI: doi.org/10.1002/cplu.202000253).
IUPAC Gold Book defines "hydrodynamic volume in polymers" (doi.org/10.1351/goldbook.H02897) on Mar. 19, 2025.
IUPAC Gold Book defines "hydrodynamically equivalent sphere in polymers" (doi.org/10.1351/goldbook.H02896) on Mar. 19, 2025.
Oxford Dictionary of Chemistry, pp. 282-283, defining "hydrodynamic radius"; Oxford University Press, New York, Ny USA, 4th Ed. 2000.

* cited by examiner

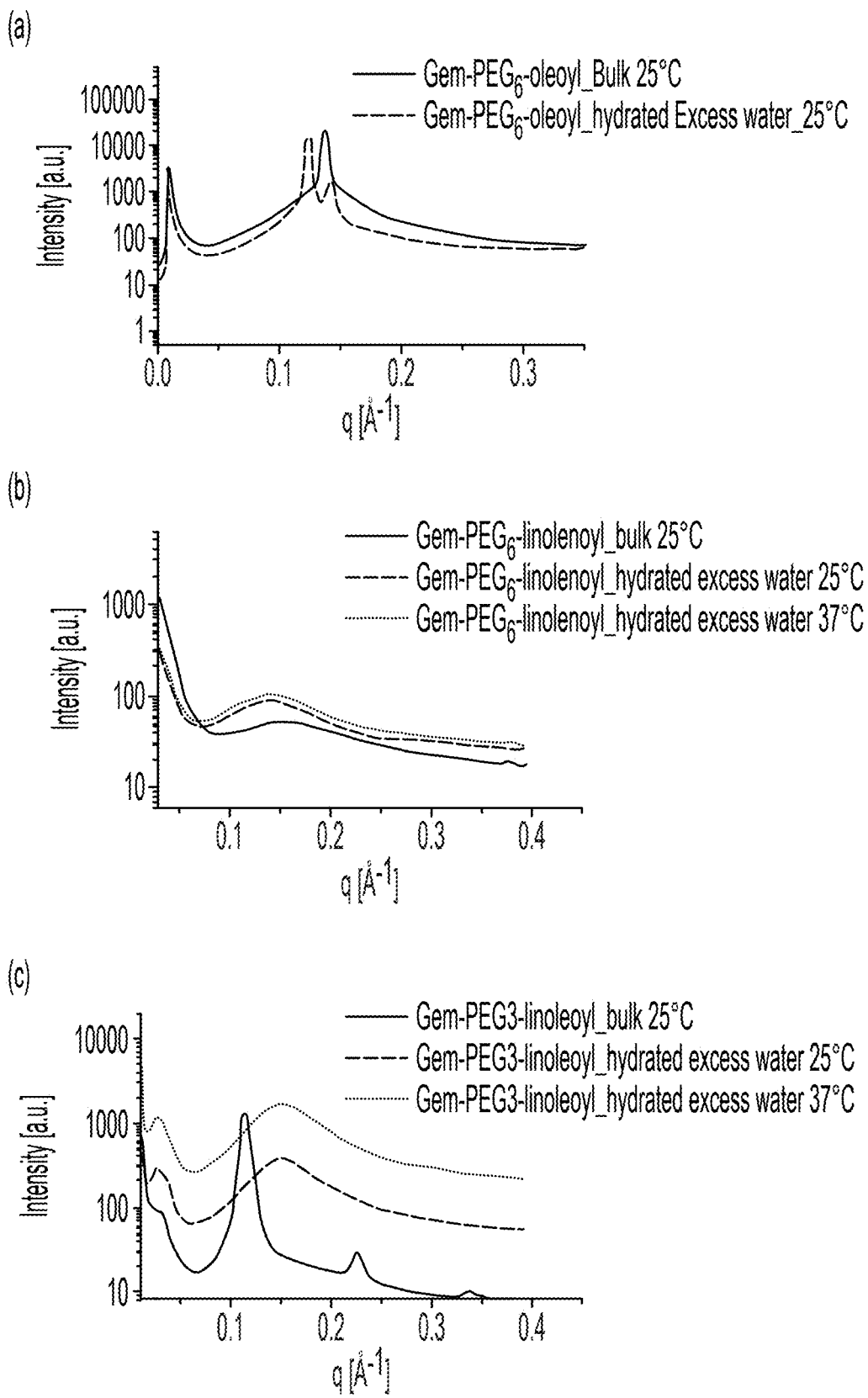
Figure 4 (to be continued)

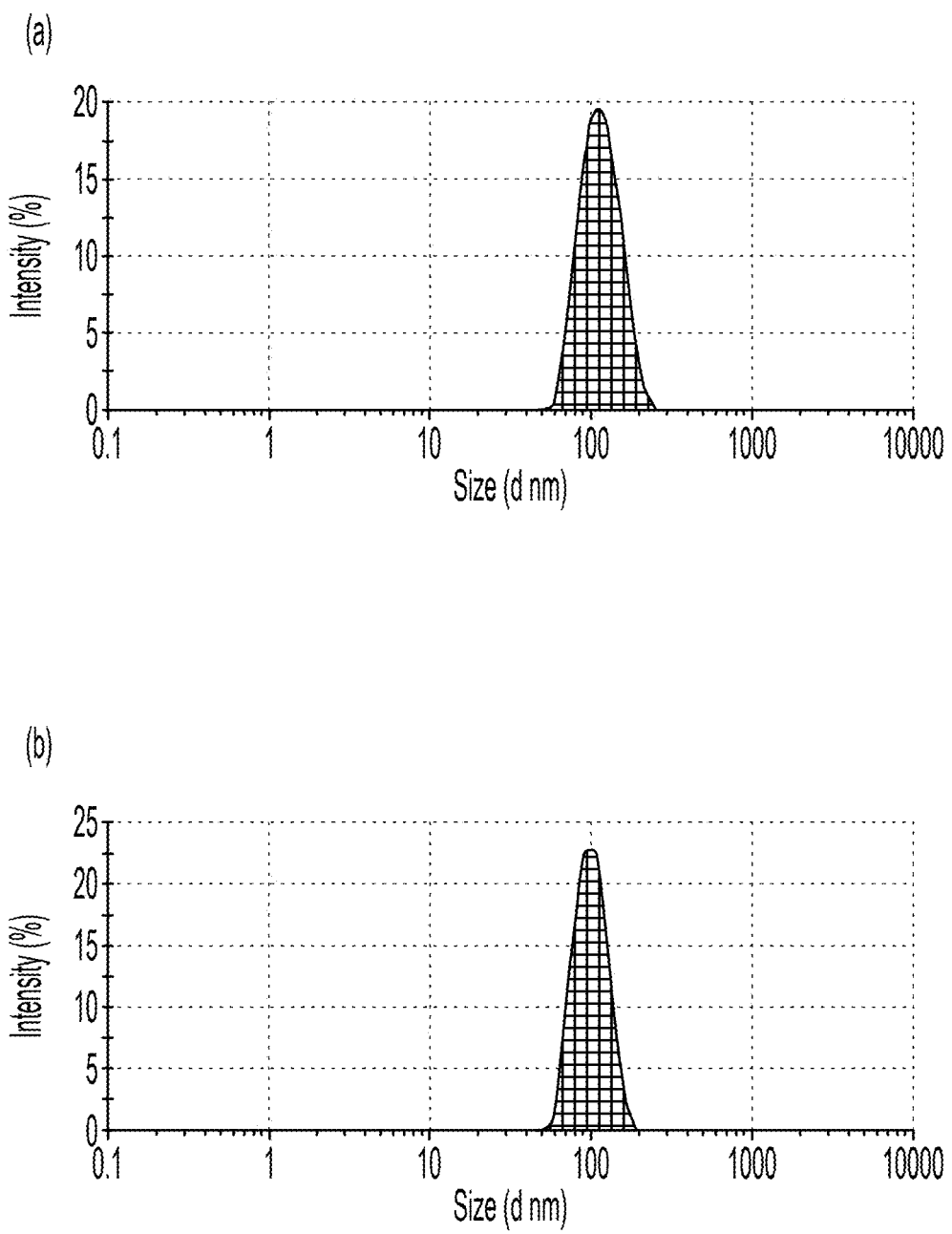
Figure 6 (to be continued)

(c)

(d)

(a)

(b)

GEMCITABINE AMPHIPHILE PRODRUGS

FIELD OF THE INVENTION

The present invention relates to improved prodrugs, and compositions thereof. In particular, it relates to amphiphilic gemcitabine prodrugs or amphiphilic prodrugs of other biologically active molecules with the capacity to make liquid crystalline nanostructured nanoparticles, and uses thereof to treat animals, including humans.

BACKGROUND OF THE INVENTION

Gemcitabine (2',2'-difluoro-2'-deoxycytidine) is a nucleoside-based chemotherapeutic agent against pancreatic, colorectal, lung, breast, ovarian and bladder cancer. It has very limited bioavailability and poor pharmacokinetics properties in vivo and is subject to deamination and deactivation in biological fluids and the blood stream.

Current chemotherapeutics, including gemcitabine, are generally non-selective and create serious side effects due to high clearance rates, poor pharmacokinetic profiles, deactivation during biocirculation, lack of tumour selectivity, and intrinsic or acquired resistance by tumours.

Efficient delivery of chemotherapeutics into the tumour site requires site specific targeting. Nanoparticles and macromolecules are well known to passively accumulate in tumours and inflammatory tissues due to their unique vascular disorders and characteristics as well as lack of a lymphatic recovery system—the so called enhanced permeation and retention effect (EPR) (Matsumura Y et al, 1986). The application of nanotechnology into medicine (nanomedicine) includes, but is not limited to, the use of nanoscale particles as drug delivery vehicles for anticancer drugs. Nanomedicines improve the therapeutic index, safety and efficacy of cancer treatments by improving their pharmacokinetics and pharmacodynamics, and by providing efficient delivery of the active drug to the site of action.

Using nanoparticles as drug delivery vehicles for anticancer drugs may effectively target delivery of the drugs to cancerous tissues and cells.

Encapsulation of anticancer agents within nanoparticles has been investigated as a second generation chemotherapeutic. Nanoparticles based on phospholipid or polymeric materials have been demonstrated in some circumstances to deliver high payloads of anticancer drugs and protect drugs from premature deactivation, resulting in increased efficacy and reduced systemic toxicity. There are several products on the market such as Doxil®, the first FDA-approved nanodrug (Barenholz Y).

Another approach includes chemically modifying the anticancer agent to form a prodrug capable of forming nanoscale particles (ie a third generation chemotherapeutic). This has been demonstrated for the active 5-fluorouracil (5-FU) which was covalently attached to a hydrophobic molecule to provide a 5-FU prodrug capable of forming nanoscale particles (U.S. Pat. No. 8,603,999). The chemically modified prodrug derivative of an active drug reduces systemic toxicity, improves pharmacokinetics and pharmacodynamics, and has superior stability in biological fluids. In vivo, the prodrug undergoes bioconversion for example, by hydrolytic, oxidative, reductive or enzymatic cleavage to the biologically active compound, preferably at the desired site of action (such as a tumour).

Gemcitabine has been incorporated into nanoparticles by conjugating the active drug to squalene (US20090130214A1). However, this system requires the use of organic solvents to form nanoparticles, which is not desirable for end use in aqueous biological fluids.

There remains a need to generate better methods of drug delivery.

Reference to any prior art in the specification is not, and should not be taken as, an acknowledgment or any form or suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The current invention seeks to provide prodrugs capable of forming self-assembled structures. The invention also provides pharmaceutical compositions thereof. These higher order phases provide a modified release profile for the drug.

In one aspect, this invention provides prodrugs of a general formula I:

$$A\text{-}Y\text{-}X \tag{1}$$

wherein A is a biologically active agent;
Y is a cleavable bond between the biologically active agent and X; and
X is selected from the group consisting of: a substituent according to formula (a), a substituent according to formula (b), a substituent according to formula (c), and a substituent according to formula (d):

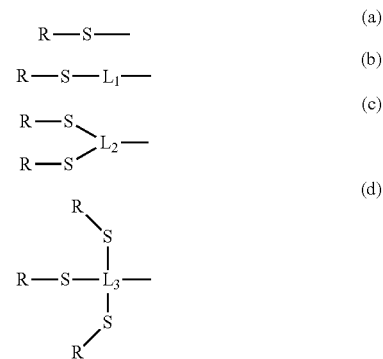

wherein
R is selected from the group consisting of alkyl, alkenyl, alkynyl, branched alkyl, branched alkenyl, branched alkynyl, substituted alkyl, substituted alkenyl and substituted alkynyl groups and their analogues;
S is (polyethylene glycol)$_n$, wherein n=1-10;
$L_1$ is a linker group that is covalently attached to one S-R group at one attachment site and to A at a second attachment site via the bio-labile bond Y to A;
$L_2$ is a linker group that is covalently attached to two S-R groups (which may be identical or different) at two independent attachment sites and to A at a third attachment site via the bio-labile bond Y to A; and
$L_3$ is a linker group that is covalently attached to three S-R groups (which may be identical or different) at three independent attachment sites and to A at a fourth attachment site via the bio-labile bond Y to A.

In an embodiment of this aspect of the invention, there is provided a prodrug of a general formula (I):

$$A\text{-}Y\text{-}X \tag{1}$$

wherein

A is a therapeutically active agent;

Y is a cleavable bond between the therapeutically active agent and X; and

X is selected from the group consisting of: a substituent according to formula (a), a substituent according to formula (b), a substituent according to formula (c) and a substituent according to formula (d):

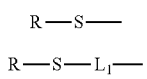

(a)

(b)

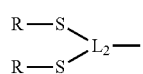

(c)

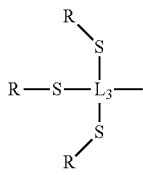

(d)

wherein

R is selected from a group consisting of alkyl, alkenyl, alkynyl, branched alkyl, branched alkenyl, branched alkynyl, substituted alkyl, substituted alkenyl and substituted alkynyl groups and their analogues;

S is (polyethylene glycol)$_n$, wherein n=1-10;

$L_1$ is a linker group that is covalently attached to the group S-R at one attachment site and to the therapeutically active agent A at a second attachment site via the bio-labile bond Y to A;

$L_2$ is a linker group that is covalently attached to two S-R groups (which may be identical or different) at two independent attachment sites and is attached to the therapeutically active agent A at a third attachment site via the bio-labile bond Y to A; and $L_3$ is a linker group that is covalently attached to three S-R groups (which may be identical or different) at three independent attachment sites and is attached to the therapeutically active agent A at a fourth attachment site via the bio-labile bond Y to A.

In one embodiment, A is a therapeutically active nucleoside agent, preferably a nucleoside agent including a cytosine base, more preferably gemcitabine.

In one embodiment, Y is a selectively cleavable bond independently selected from the group consisting of: amide, carbamate, sulfonamide, imide, imine, and carbonate. Preferably, Y is independently selected from the group consisting of amide and carbamate. In a particularly preferred embodiment, Y is a carbamate bond.

In a preferred embodiment, X is a substituent according to formula (a) for a prodrug of a general formula (I).

In one preferred embodiment, the general formula (I) represents a compound according to formula (II):

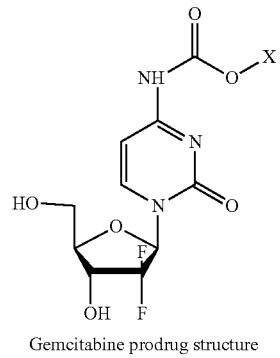

(II)

Gemcitabine prodrug structure wherein

X is selected from the group consisting of: a substituent according to formula (a), a substituent according to formula (b), a substituent according to formula (c), a substituent according to formula (d), and a substituent according to formula (e):

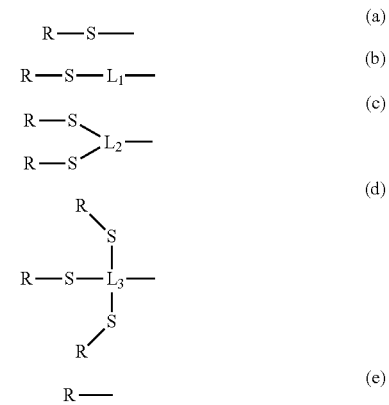

wherein

R is selected from a group consisting of alkyl, alkenyl, alkynyl, branched alkyl, branched alkenyl, branched alkynyl, substituted alkyl, substituted alkenyl and substituted alkynyl groups and their analogues;

S is (polyethylene glycol)$_n$, wherein n=1-10;

$L_1$ is a linker group that is covalently attached to the group S-R at one attachment site and to gemcitabine at a second attachment site via the carbamate bond to gemcitabine;

$L_2$ is a linker group that is covalently attached to two S-R groups (which may be identical or different) at two independent attachment sites and is attached to gemcitabine at a third attachment site via the carbamate bond to gemcitabine; and $L_3$ is a linker group that is covalently attached to three S-R groups (which may be identical or different) at three independent attachment sites and is attached to gemcitabine at a fourth attachment site via the carbamate bond to gemcitabine.

In a preferred embodiment, X is a substituent according to formula (a) or (e) for a prodrug of formula (II). R is generally hydrophobic. Optionally, R has a linear chain length equivalent to 10 to 30 carbon atoms. In one embodiment, R is alpha-tocopherol. In another embodiment, R is an isoprenoid group. In other embodiments, R is an hydroxylated alkyl or hydroxylated alkenyl group. Preferred embodiments of R are: alkyl, alkenyl, alkynyl, branched alkyl, branched alkenyl (isoprenoid), branched alkynyl, substituted alkyl, substituted alkenyl and substituted alkynyl groups and their analogues such as alpha-tocopherol, hydroxylated alkyl or alkenyl groups. In preferred embodiments, R has a chain length equivalent to 10 to 24 carbon atoms, more preferably equivalent to 12 to 24 carbon atoms, and more preferably equivalent to 14 to 20 carbon atoms. When X is a substituent according to formula (c) or formula (d), each R may be independently selected from the group consisting of alkyl, alkenyl, alkynyl, branched alkyl, branched alkenyl, branched alkynyl, substituted alkyl, substituted alkenyl and substituted alkynyl groups and their analogues. Alternatively, the R groups may be identical. Generally, R is intended to confer self-assembling properties to A.

In preferred embodiments, R is selected from the group consisting of myristyl, myristoyl, myristoylamide, palmityl, palmitoyl, palmitoylamide, stearyl, stearoyl, stearoylamide, oleyl, oleoyl, oleoylamide, linoleyl, linoleoyl, linoleoylamide, linolenyl, linolenoyl, linolenoylamide, arachidonyl, arachidonoyl, arachidonoylamide, phytanyl, phytanoyl, phytanoylamide, hexahydrofarnesyl, hexahydrofarnesoyl, and hexahydrofarnesoylamide chains. Most preferably, R is selected from the group consisting of oleyl, oleoyl, linoleyl, linoleoyl, phytanyl, and phytanoyl chains.

In one embodiment, S is selected from the group consisting of: polyethylene glycol $(PEG)_{1-10}$, α-carboxy polyethylene glycol $(HOOC\text{-}PEG)_{1-10}$ and α-amino polyethylene glycol $(H_2N\text{-}PEG)_{1-10}$. Preferably, S is $(PEG)_{1-10}$, more preferably S is $(PEG)_{1-6}$. In a particularly preferred embodiment, S is $(PEG)_{3-6}$.

In one embodiment, $L_1$ is a selectively cleavable linker group selected from the group consisting of: succinic anhydride, maleic anhydride, glycolic acid, chloroacetic acid, allyl isocyanoacetate, hydroxy propane sulfonic acid, glycine and alanine. In another embodiment, $L_2$ is a selectively cleavable linker group selected from the group consisting of: diethanolamine, propane-1,2,3-tricarboxylic acid, cysteine, glutamic acid, glutamine, aspartic acid, serine, tyrosine, lysine, arginine, histidine and threonine. In another embodiment, $L_3$ is a selectively cleavable linker group selected from the group consisting of: tris(hydroxymethyl) aminoethane (Tris) and citric acid.

The compound according to Formula (II) can be made as described in Scheme 1 below.

In particularly preferred embodiments, the general formula (II) represents a compound selected from the group consisting of:

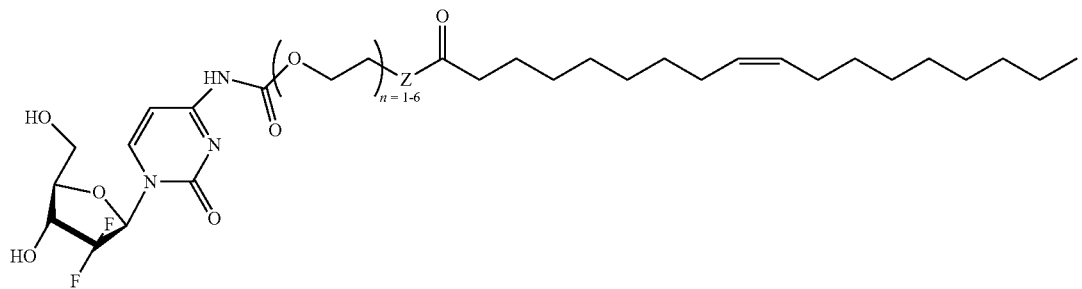

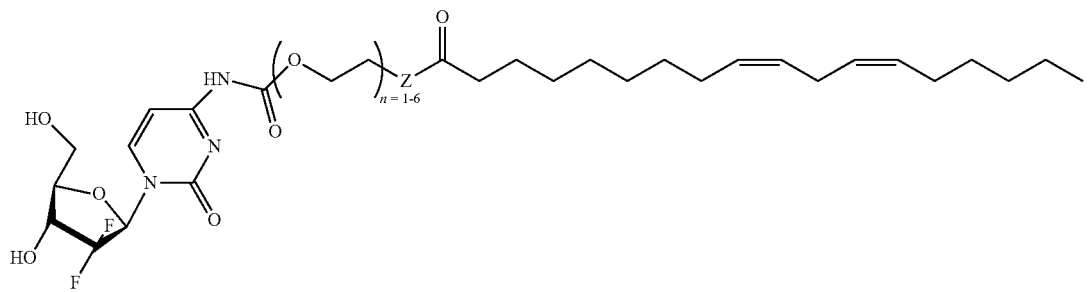

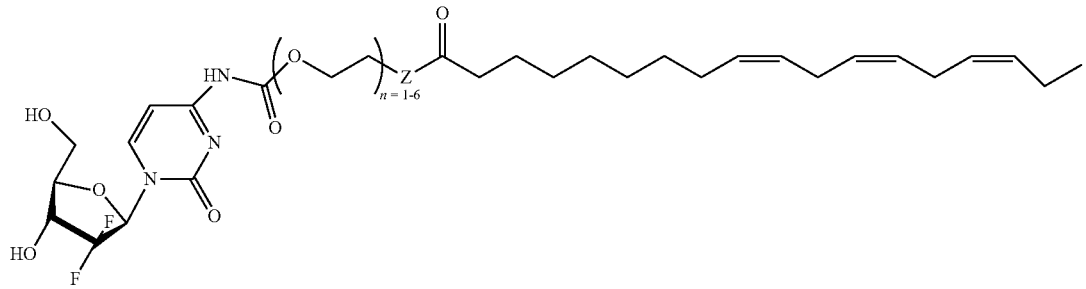

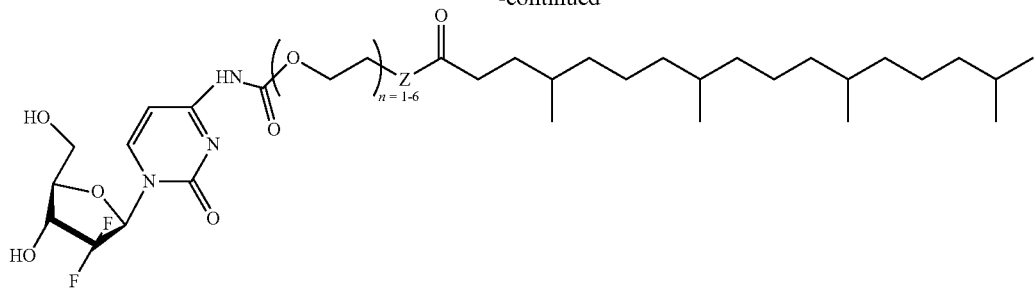
wherein Z is O or NH.
More preferably, the general formula (II) represents a compound selected from the group consisting of:
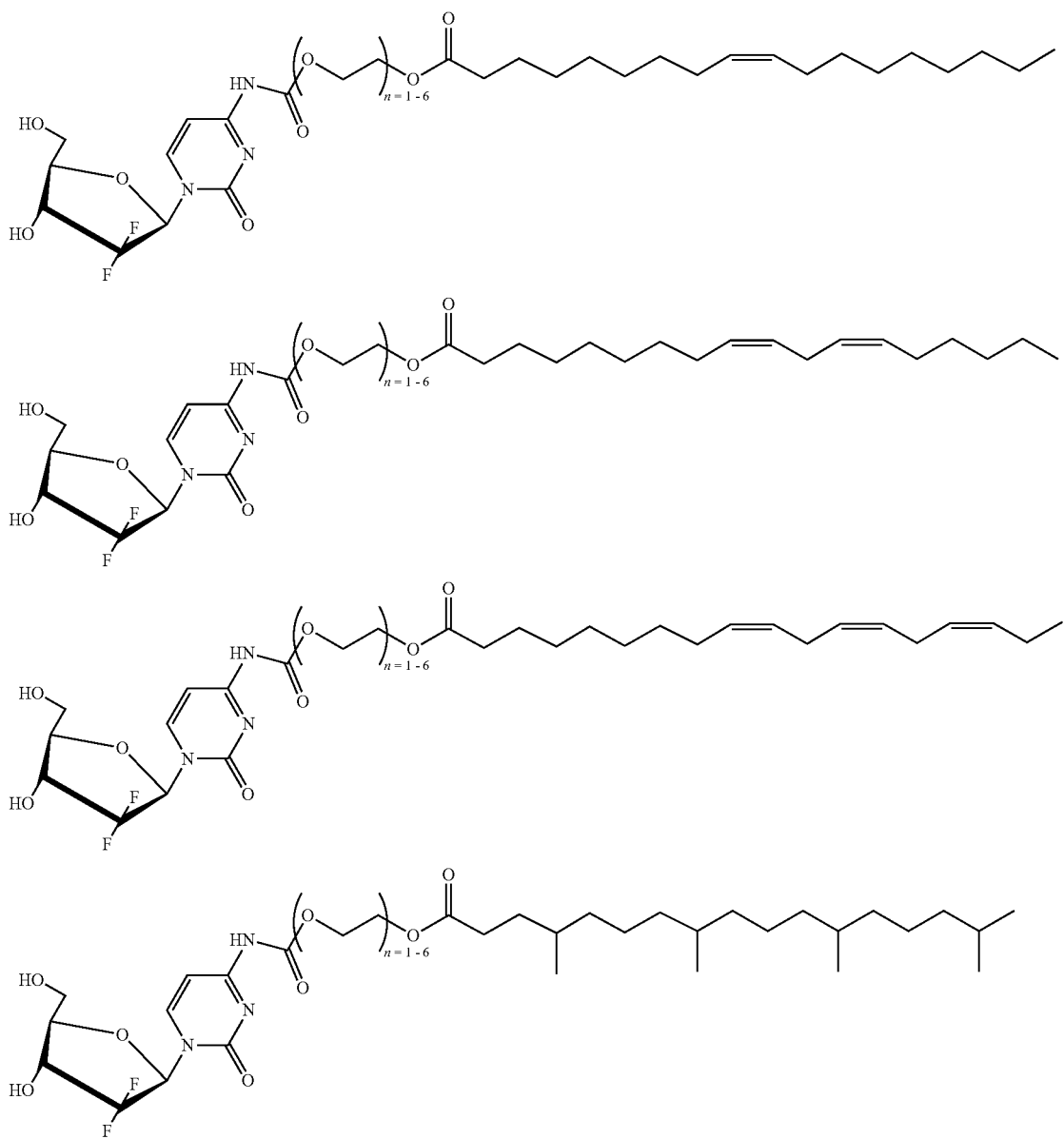

Preferably, a prodrug of general formula (I) or (II) is capable of forming a self-assembled structure having a lyotropic phase that displays lamellar, cubic, hexagonal, sponge, emulsion, or crystalline lamellar morphologies. More preferably, the phase is a lamellar, cubic, hexagonal, or sponge phase. More preferably still, the phase is an inverse phase. In a particularly preferred embodiment, the phase is lamellar and inverse.

In a second aspect of the invention there is provided self-assembled structures of the prodrugs of the general formula (I) or (II) of the above aspect. In one embodiment, the self-assembled structures of the prodrugs of the general formula (I) or (II) further comprise a component selected from the group consisting of: phospholipids, cholesterol, glycerol lipids, prodrug amphiphiles, and combinations thereof. Preferably, the self-assembled structures of the prodrugs of the general formula (II), wherein X is a substituent according to formula (e), further comprise a component selected from the group consisting of: phospholipids, cholesterol, glycerol lipids, prodrug amphiphiles, and combinations thereof.

Preferably, the self-assembled structure is a lyotropic phase that displays lamellar, cubic, hexagonal, sponge, emulsion, or crystalline lamellar morphologies. More preferably, the phase is a lamellar, cubic, hexagonal, or sponge ($L_3$) phase. More preferably still, the phase is an inverse phase. Generally inverse phases are advantageous as drug delivery vehicles because of their thermodynamic stability in excess water, greater surface area and controlled channel dimensions, the latter property being particularly important for release of active embedded within a self-assembled matrix. Accordingly, there is provided prodrugs that are capable of self-assembly into lamellar, inverse cubic, inverse sponge ($L_3$), inverse hexagonal or inverse micellar ($L_2$) phases, preferably lamellar, inverse cubic or $L_3$ phases. In another embodiment, the self-assembled prodrug has a crystalline structure.

The self-assembled structure of the prodrugs according to the current invention may be a bulk phase, or may be colloidal particles derived therefrom. Particularly preferred colloidal particles may be selected from the following group: liposomes, cubosomes, hexosomes, "sponge-like" particles or inverse micelles. Depending on conditions, more than one phase may be present in a self-assembled structure.

In a particularly preferred embodiment the self-assembled structures are of gemcitabine prodrugs of formula (II). Preferably, the self-assembled structures are lamellar, cubic, $L_2$ or $L_3$ phases. Such particles may be suitably stabilised for pharmaceutical use by a surfactant stabiliser, such as polyethyleneglyocol-lipid, polysorbate or poloxamer.

In another aspect of the present invention there is provided a method of modulating the release of a biologically active agent, such as a drug or prodrug, comprising covalently linking the biologically active agent A to at least one tail component R via a spacer S and a cleavable covalent bond Y to form an amphiphile capable of self-assembling into a self-assembled structure under physiological conditions, and wherein the amphiphile is cleavable in vivo to release the biologically active agent.

In one embodiment of this aspect there is provided a method of modulating the bioavailability of a biologically active agent A, the method including covalently linking the biologically active agent A to at least one tail component R via a cleavable covalent bond Y to form an amphiphile, wherein the covalent bond is cleavable in vivo to release the biologically active agent from the self-assembled structure; administering the amphiphile to a patient such that the amphiphile self-assembles into a self-assembled structure.

In another aspect of the present invention there is provided a pharmaceutical composition for the treatment of a disease state comprising as an active ingredient self-assembled structures of formula (I) or (II). In some embodiments, the pharmaceutical composition for the treatment of the disease state consists essentially of an active ingredient that is a self-assembled structure of formula (I) or (II), optionally in combination with other phospholipids, cholesterol, glycerol lipids, or other prodrug amphiphiles in self-assembled structures. In some embodiments, the self-assembled structures display a lamellar, cubic, hexagonal, micellar cubic, micellar or sponge phase. Preferably, in some embodiments, the active ingredient is self-assembled structures of formula (II) in liposomes, cubosomes, hexosomes, inverse micellar or less ordered sponge-like nanoparticles or solid lipid nanoparticles or a combination thereof.

In some embodiments, the disease state is that of the presence of a tumor, and the pharmaceutical composition comprises as an active ingredient solid lipid particles or self-assembled structures of Formula (II).

The self-assembled structure/active ingredient is preferably present in the pharmaceutical composition in a therapeutically active amount.

In another aspect of the present invention there is provided a method for treatment of a disease state comprising administering a therapeutically effective amount of a pharmaceutical composition for the treatment of a disease state comprising as an active ingredient self-assembled structures of formula (I) or (II) optionally in combination with other phospholipids, cholesterol, glycerol lipids, or other prodrug amphiphiles in a self-assembled colloidal particles to a patient. In some embodiments the self-assembled structures display liposomes, cubosomes, hexosomes, micellar cubosomes, micellar or sponge-like nanoparticles. Preferably, in some embodiments, the active ingredient is self-assembled structures of formula (II), optionally in combination with other phospholipids, cholesterol, glycerol lipids, or other prodrug amphiphiles in a self-assembled structure such as liposomes, cubosomes, hexosomes, inverse micellar or less ordered sponge-like nanoparticles or solid lipid nanoparticles or a combination thereof.

In some embodiments, the disease state is due to the presence of a tumour and in this case it is preferable that the pharmaceutical composition comprises an active ingredient of a self-assembled structure of formula (II), optionally in combination with other phospholipids, cholesterol, glycerol lipids, or other prodrug amphiphiles in self-assembled structures in the form of liposomes, inverse cubosomes, hexosomes, micellar or less ordered sponge nanoparticles or solid lipid nanoparticles or a combination thereof.

In another aspect of the present invention there is provided a self-assembled structure according to the current invention of formula (II), optionally in combination with other phospholipids, cholesterol, glycerol lipids, or other prodrug amphiphiles in a self-assembled structure for the manufacture of a medicament for the treatment of a disease state. The medicament comprises self-assembled bulk or colloidal particle structures as previous aspects of the current invention.

In some embodiments, the disease state is due to the presence of a tumour, and in this case it is preferable that the pharmaceutical composition comprises as an active ingredient a self-assembled structure of formula (II), optionally in combination with other phospholipids, cholesterol, glycerol lipids, or other prodrug amphiphiles in a self-assembled structure in the form of liposomes, inverse cubosomes, hexosomes, micellar or less ordered sponge-like nanoparticles, solid lipid nanoparticles or a combination thereof.

In another aspect of the present invention there is provided a method of delivering a biologically active agent by utilising the enhanced permeation and retention effect by forming self-assembled structures comprising the active, the method comprising covalently linking the biologically active agent to at least one tail component R via a spacer S and a cleavable linkage Y to form an amphiphile capable of self-assembling into a self-assembled structure under physiological conditions, and wherein the amphiphile is cleavable in vivo to release the biologically active agent. Preferably, the biologically active agent is gemcitabine.

In one embodiment of this aspect there is provided a method of delivering a biologically active agent, the method including covalently linking the biologically active agent to at least one tail component to form an amphiphile, wherein the link is cleavable in vivo to release the biologically active agent from the self-assembled structure; administering the amphiphile to a patient such that the amphiphile self-assembles into a self-assembled structure.

Preferably, the amphiphile self-assembles to form a self-assembled structure of a lyotropic mesophase that display lamellar, cubic, hexagonal, sponge and/or emulsified morphologies and their analogous nanoparticles, solid lipid nanoparticles or a combination thereof.

A further aspect of the present invention relates to a process for preparing the bulk phases of lamellar, cubic, hexagonal, sponge phases and crystalline mesophases according to the current invention prepared by the process of this aspect.

A further aspect of the present invention relates to a process for preparing colloidal particles from the bulk phase according to the current invention. There is further provided colloidal particles according to the current invention prepared by the process of this aspect.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, compositions and methods are clearly within the scope of the invention, as described herein.

Further aspects of the present invention and further embodiments of the aspects described in the preceding paragraphs will become apparent from the following description, given by way of example and with reference to the accompanying drawings.

It will be understood that the term "comprises" (or its grammatical variants) as used in this specification is equivalent to the term "includes" and should not be taken as excluding the presence of other elements or features.

DETAILED DESCRIPTION OF THE EMBODIMENTS

Figure 1:
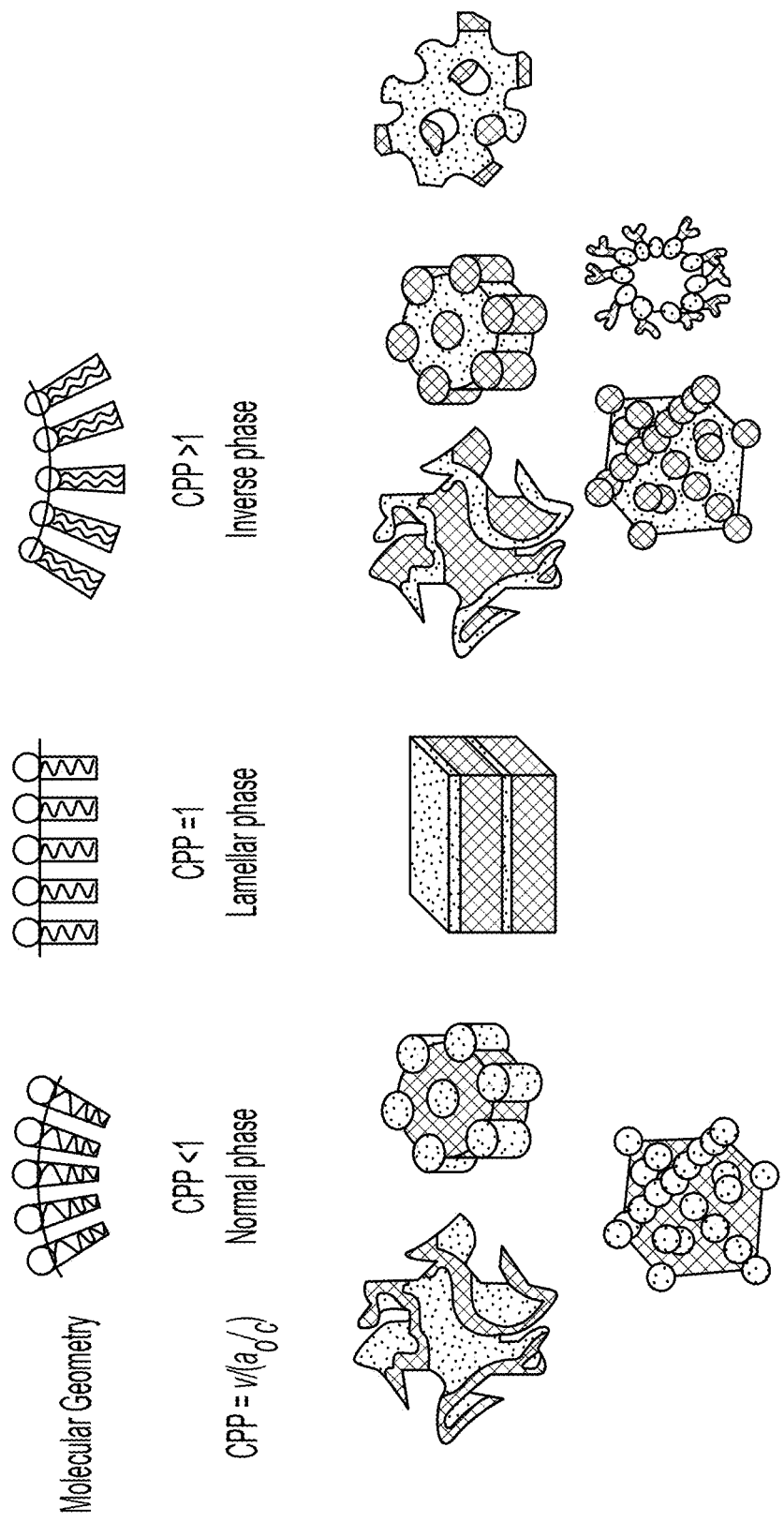
FIG. 1: Schematic picture of the different phases that can occur upon hydration of different amphiphiles. Abbreviations for different mesophases are micellar (L1); micellar cubic (I1), normal hexagonal (H1), bicontinuous cubic (V1), Lamellar (Lα), inverse bicontinuous cubic (V2), inverse hexagonal (H2), inverse micellar cubic (I2), and inverse micellar (L2), where subscripts 1 and 2 refer to "normal" and "inverse" phases, respectively.

It will be noted that various terms employed in the specification, examples and claims have meanings that will be understood by one of ordinary skill in the art. However, for clarity of meaning intended in this document, certain terms are defined below.

The term "prodrug" as used throughout the specification refers to a biologically active compound including structural modifications thereto, such that in vivo the prodrug is converted, for example, by hydrolytic, oxidative, reductive or enzymatic cleavage to the biologically active compound by one or more reactions or steps. It includes an active that requires general steps of metabolism to produce the active biological molecule—that is, this term is also understood to encompass "pre-prodrugs".

The term Gemcitabine prodrug as used throughout the specification refers to a compound of general formula (II) that is capable of being converted to Gemcitabine in vivo, for instance, by means of enzymatic and/or chemical reaction.

Formula II

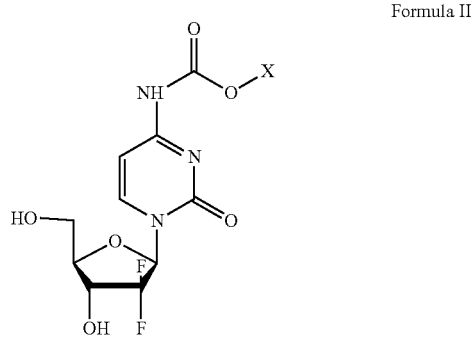

where
X is selected from the group consisting of: a substituent according to formula (a), a substituent according to formula (b), a substituent according to formula (c), a substituent according to formula (d), and a substituent according to formula (e):

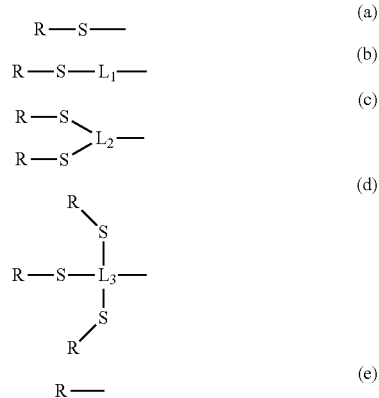

wherein
R is selected from a group consisting of alkyl, alkenyl, alkynyl, branched alkyl, branched alkenyl, branched alkynyl, substituted alkyl, substituted alkenyl and substituted alkynyl groups and their analogues;
S is (polyethylene glycol)$_n$, wherein n=1-10;
$L_1$ is a linker group that is covalently attached to the group S-R at one attachment site and to gemcitabine at a second attachment site via the carbamate bond to gemcitabine;
$L_2$ is a linker group that is covalently attached to two S-R groups (which may be identical or different) at two independent attachment sites and is attached to gemcitabine at a third attachment site via the carbamate bond to gemcitabine; and $L_3$ is a linker group that is covalently attached to three S-R groups (which may be identical or different) at three independent attachment sites and is attached to gemcitabine at a fourth attachment site via the carbamate bond to gemcitabine.
where X is a molecule capable of conferring self-assembly properties to the compound.

The term "self-assembled structure" as used throughout the specification is meant to refer to an aggregate of amphiphiles that possess some degree of internal organisational order. The self-assembled structures may be formed by contacting the amphiphile with solvent. The self-assembled structure may refer to either a bulk lyotropic phase, a colloidal particle derived therefrom (a so-called "colloidosome"), or a solid lipid particle.

The term "bulk phase" as used throughout the specification is understood to mean a lyotropic phase that includes but is not limited to: micellar cubic ($I_1$); normal hexagonal ($H_1$); bicontinuous cubic ($V_1$); lamellar ($L_\alpha$); inverse bicontinuous cubic ($V_2$); inverse hexagonal ($H_2$); inverse micellar cubic ($L_2$) and sponge ($L_3$) phases.

The term "colloidal particle" as used throughout the specification is to be understood to refer to "colloidosomes" and solid lipid particles. The term "colloidosome" as used throughout the specification is to be understood to refer to a colloidal particle that possesses the same internal nanostructure of a bulk lyotropic phase. The term solid lipid particle as used throughout the specification is understood to mean a colloidal particle of the prodrug of the current invention, wherein the colloidal particle comprises a core of the neat prodrug and usually will be stabilised by a surface layer of surfactant. The neat prodrug core may be in a crystalline, microcrystalline, liquid crystalline or a non-crystalline form. It will be understood that the term "particle" refers to particles that may be nanoparticles or microparticles based on their average size. Often such particles are referred to as "solid lipid nanoparticles" although they may in fact be in a size range of microparticles. This form of self-assembled structure does not swell upon contact with excess solvent.

The term "lamellar phase" as used throughout the specification is to be understood to mean a stacked bilayer arrangement, where opposing monolayers of the hydrophilic portion of amphiphile molecules are separated by a polar solvent domain, while the hydrophobic portion of the amphiphile molecule of the back-to-back layers are in intimate contact to form a hydrophobic layer. The planar lamellar phase is referred to as the "$L_3$ phase".

The term "cubic phase" as used throughout the specification refers to two main classes of phases: micellar cubic and bicontinuous cubic. "Micellar cubic phase" refers to a phase consisting of spherical micelles arranged in a cubic array. A "normal micellar cubic phase" or "Li phase" consists of spherical normal micelles. The term "inverse micellar cubic phase" consists of spherical inverse micelles arranged in a cubic array.

"Bicontinuous cubic phase" refers to a family of closely related phases that consist of a single curved lipid bilayer that forms a complex network that separates the polar solvent space into two continuous, but non-intersecting volumes. Bicontinuous cubic phases possess long range order based upon a cubic unit cell. Bicontinuous cubic phases have zero mean curvature; that is, at all points on surface of the amphiphile bilayer, the surface is as convex as it is concave. Bicontinuous cubic phases may be of the normal ("vi phase") or inverse ("vii phase") type. Several types of long range orientational orders have been observed for bicontinuous cubic phases; the orientational order in these phases correspond to space groups Ia3d, Pn3m, and Im3m. When a colloidosome possesses the internal structure of a bulk cubic phase the colloidosome may be referred to as a "cubosome".

The term "hexagonal phase" as used throughout the specification is to be understood to mean an amphiphile phase consisting of long, rod-like micelles packed into a hexagonal array. A "normal hexagonal phase" is a hexagonal phase consisting of long, rod-like normal micelles, whilst an "inverse hexagonal phase" is a hexagonal phase consisting of long, rod-like inverse micelles. The normal hexagonal phase may be referred to as the "Hi phase" and the inverse hexagonal phase may be referred to as the "Hii phase". When a colloidosome possesses the internal structure of a bulk hexagonal phase the colloidosome may be referred to as a "hexosome".

The term "sponge phase" or "$L_3$ phase" as used throughout the specification refers to a phase that resembles a bicontinuous cubic phase, in that it possesses an amphiphile bilayer that separates the polar solvent space into two unconnected volumes, but it does not possess long range order. Accordingly, these phases are analogous to a "melted cubic phase".

The term "lattice parameter" as used throughout the specification means a set of lattice constants that define a unit cell of a crystalline solid or liquid crystal, and may include values such as the length of the unit cell.

The term "isoprenoid" as used throughout the specification is to mean an alkyl chain consisting of isoprene (2-methyl-1,3-butadiene) monomers or subunits. The use of the term "isoprenoid" as used herein is intended to encompass unsaturated, partially saturated or fully saturated isoprene analogues and derivatives.

The term "pharmaceutical composition" as used throughout the specification means a composition comprising a therapeutically effective amount of at least one prodrug according to the current invention and at least one pharmaceutically acceptable carrier, excipient, diluent, additive or vehicle selected based upon the intended form of administration, and consistent with conventional pharmaceutical practices.

The terms "biologically active agent", "therapeutically active agent", "pharmaceutically active agent", "active agent" and "active ingredient" as used throughout the specification to refer to substances that are intended for, without limitation, the diagnosis, cure, mitigation, treatment, prevention and/or modification of a state in a biological system. Reference to a "biologically active agent" is broader than reference to a "therapeutically active agent". The terms "drug" and therapeutic agent are used interchangeably throughout this specification.

The biologically active agent may be a drug, in which case A-Y-X represents a prodrug. In another embodiment, the biologically active agent may be a prodrug. Accordingly, the biologically active agent may be an agent capable of being metabolised to a biologically active agent, in which case A-Y-X represents a pre-prodrug. The biologically active agent is preferably a therapeutically active agent.

As used herein, "therapeutically effective amount" relates to the amount or dose of a drug such as a gemcitabine prodrug or composition thereof that will lead to one or more desired effects, in particular the inhibition or cessation of tumour growth. A therapeutically effective amount of a substance will vary according to factors such as the disease state, age, sex, and weight of a subject, and the ability of the substance to elicit a desired response in the subject.

In one aspect, this invention provides prodrugs of a general formula I:

$$A\text{-}Y\text{-}X \qquad (1)$$

wherein A is a biologically active agent;
Y is a cleavable bond between the therapeutically active agent and X; and
X is selected from the group consisting of: a substituent according to formula (a), a substituent according to formula (b), a substituent according to formula (c), and a substituent according to formula (d):

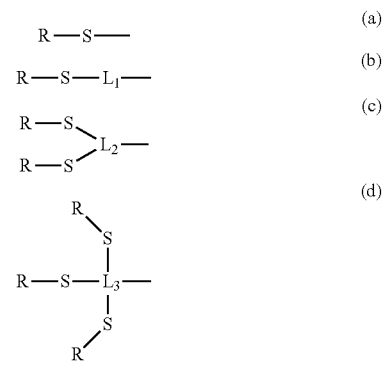

wherein
R is selected from the group consisting of alkyl, alkenyl, alkynyl, branched alkyl, branched alkenyl, branched alkynyl, substituted alkyl, substituted alkenyl and substituted alkynyl groups and their analogues;
S is (polyethylene glycol)$_n$, wherein n=1-10;
$L_1$ is a linker group that is covalently attached to one S-R group at one attachment site and to A at a second attachment site via the bio-labile bond Y to A;
$L_2$ is a linker group that is covalently attached to two S-R groups (which may be identical or different) at two independent attachment sites and to A at a third attachment site via the bio-labile bond Y to A; and
$L_3$ is a linker group that is covalently attached to three S-R groups (which may be identical or different) at three independent attachment sites and to A at a fourth attachment site via the bio-labile bond Y to A.

In a preferred embodiment, X is a substituent according to formula (a) for a prodrug of a general formula (I).

R is generally hydrophobic. Optionally, R has a linear chain length equivalent to 10 to 30 carbon atoms. In one embodiment, R is alpha-tocopherol. In another embodiment, R is an isoprenoid group. In other embodiments, R is an hydroxylated alkyl or hydroxylated alkenyl group. Preferred embodiments of R are: alkyl, alkenyl, alkynyl, branched alkyl, branched alkenyl, alkynyl (isoprenoid), substituted alkyl, substituted alkenyl and substituted alkynyl groups and their analogues such as alpha-tocopherol, hydroxylated alkyl or alkenyl groups. In preferred embodiments, R has a chain length equivalent to 10 to 24 carbon atoms, and more preferably equivalent to 14 to 20 carbon atoms. When X is a substituent according to formula (c) or formula (d), each R may be independently selected from the group consisting of alkyl, alkenyl, alkynyl, branched alkyl, branched alkenyl, branched alkynyl, substituted alkyl, substituted alkenyl and substituted alkynyl groups and their analogues. Alternatively, both R groups may be identical. Generally, R is intended to confer self-assembling properties to A.

In preferred embodiments, R is selected from the group consisting of myristyl, myristoyl, myristoylamide, palmityl, palmitoyl, palmitoylamide, stearyl, stearoyl, stearoylamide, oleyl, oleoyl, oleoylamide, linoleyl, linoleoyl, linoleoylamide, linolenyl, linolenoyl, linolenoylamide, arachidonyl, arachidonoyl, arachidonoylamide, phytanyl, phytanoyl, phytanoylamide, hexahydrofarnesyl, hexahydrofarnesoyl, and hexahydrofarnesyl, hexahydrofarnesoyl, and hexahydrofarnesoylamide chains. Most preferably, R is selected from the group consisting of oleyl, oleoyl, linoleyl, linoleoyl, phytanyl, phtanoyl, hexahydrofarnesyl and hexahydrofarnesoyl chains.

As used herein the term "alkyl" refers to a straight or branched chain hydrocarbon radical having from 10 to 30 carbon atoms, or any range between. The alkyl group is optionally substituted with substituents, multiple degrees of substitution being allowed. Examples of "alkyl" as used herein include, but are not limited to, decane, undecane, dodecane, tridecane, tetradecane, pentadecane, hexadecane, heptadecane, octadecane, nonadecane, icosane, henicosane, docosane, tricosane, tetracosane, pentacosane, hexacosane, heptacosane, octacosane, nonacosane, triacontane, and the like.

As used herein, the term "$C_{10}$-$C_{30}$ alkyl" refers to an alkyl group, as defined above, containing at least 10 and at most 30 carbon atoms respectively, or any range in between 12-24. (e.g. alkyl groups containing 12-24 carbon atoms are also within the range of $C_{10}$-$C_{30}$).

As used herein the term "alkenyl" refers to an alkyl group containing a double bond. It may also be optionally substituted with substituents, multiple degrees of substitution being allowed.

As used herein the term "alkynyl" refers to an alkyl group containing a triple bond. It may also be optionally substituted with substituents, multiple degrees of substitution being allowed.

The terms "optionally substituted" or "may be substituted" and the like, as used throughout the specification, denotes that the group may or may not be further substituted or fused (so as to form a polycyclic system), with one or more non-hydrogen substituent groups. Suitable chemically viable substituents for a particular functional group will be apparent to those skilled in the art. Examples of suitable substituents include, but are not limited to oxygen or sulfur substituted analogues.

In some embodiments according to the current invention, $L_1$, $L_2$ and $L_3$ are linker groups. A "linker" refers to a group that acts as a multifunctional domain between the biologically active agent A and the group S-R. Linkers are at least bifunctional in the case of Li, are at least trifunctional in the case of $L_2$, and are at least tetrafunctional in the case of $L_3$, containing at least one functional group (an "attachment site") to anchor the group S-R at one site in the molecule, and another selectively cleavable functional group at another attachment site to anchor the drug A via a Y bond. Preferably, the linker group is a covalent bond.

$L_1$, $L_2$, and $L_3$ may be at least one functional group attached to at least one selectively cleavable functional group. Preferably, Li, $L_2$, and $L_3$ include a moiety that links at least one functional group and at least one selectively cleavable functional group. The moiety may be, for example, selected from the group consisting of heteroatoms, alkyl, alkenyl, alkyne, where these may be cyclic and/or include further heteroatoms and functional substituents (such as carbonyl, carboxylic, amide, hydroxyl, ether, amine), or a combination of any of these.

$L_1$ includes a selectively cleavable functional group selected from the group consisting of: succinic anhydride, maleic anhydride, glycolic acid, allyl sulfonamide, allyl isocyanoate, hydroxy propane sulfonic acid, chloroacetic acid, glycine and alanine. $L_2$ is a selectively cleavable linker group selected from the group consisting of: diethanolamine, propane-1,2,3-tricarboxylic acid, cysteine, glutamic acid, glutamine, aspartic acid, serine, tyrosine, arginine, lysine, arginine, histidine and threonine. $L_3$ is a selectively cleavable linker group selected from the group consisting of: tris(hydroxymethyl) aminoethane (Tris) and citric acid. The examples provided for $L_1$, $L_2$, and $L_3$ are not intended to be an exhaustive list and the current invention contemplates other embodiments of $L_1$, $L_2$, and $L_3$.

The bond Y between A and L is capable of being cleaved in vivo upon metabolism of the prodrug A-Y-L-S-R. Examples of the bond Y include selectively cleavable bonds including but not limited to: amides, carbamates, esters, imides, sulphonamides, and imines. In a preferred embodiment, the covalent bond is labile so that it may be cleaved when required to release the active drug, but stable enough to resist premature activation. Preferably, Y is a carbamate or amide bond. In a particularly preferred embodiment, Y is a carbamate bond.

The bond (Y) between the drug (A), linker (L) or spacer (S) and hydrophobic tail group (R) may include a carbamate or amide bond between the drug and spacer. There is preferably a carbamate, amide, ester or thioester bond between the spacer and the hydrophobic tail. Other bifunctional groups can be also added as required and are known in the art, such as chloroacetic acid, hydroxyl or thiol groups, and combinations thereof.

In some embodiments according to the current invention, S is a spacer. A "spacer" refers to a bifunctional group that links directly to the therapeutically active domain A or via a linker L on one end and the hydrophobic group R on the other end. The spacer supports improved solvation of the head group in polar solvents and renders better self-assembly properties. Spacers are usually bifunctional, containing one functional group to anchor to the R group on one end of the molecule, and one to attach the drug A or via a linker (L) using a selective and cleavable Y bond. In one embodiment, S is selected from the group consisting of: polyethylene glycol $(PEG)_{1-10}$, α-carboxy polyethylene glycol $(HOOC-PEG)_{1-10}$ or α-amino polyethylene glycol $(H_2N\text{-}PEG)_{1-10}$. Preferably, S is $(PEG)_{1-10}$, more preferably S is $(PEG)_{1-6}$. In a particularly preferred embodiment, S is $(PEG)_{3-6}$. The skilled person would understand which compounds and methods are suitable for attaching A to X.

Preferably, A is a hydrophilic biologically active agent. For example, A is a biologically active agent with a log P value of less than 0. In another embodiment, A is an agent capable of being metabolised to a biologically active agent, the biologically active agent being hydrophilic with a log P value of less than 0. In one embodiment, A is itself a prodrug that is converted, for example by hydrolytic, oxidative, reductive or enzymatic cleavage to the biologically active agent by one or more reaction steps. When A itself is a prodrug, the general formula (I) may be considered to describe a compound referred to as a pre-prodrug.

The current invention envisages that the therapeutically active agent A may itself be a prodrug instead of a drug or active. It will be recognised by the skilled addressee that in the compounds according to formula (II) above, A is a prodrug that undergoes modification in vivo to release the therapeutically active agent, Gemcitabine triphosphate. That is, A is a precursor to the biologically active agent formed in vivo after cleavage of the prodrug by, for instance, an enzyme.

The compound A may or may not require further chemical modification steps before resulting in the therapeutically active form. i.e. the compound A may itself be a prodrug, in which case A-Y-L-S-R could be described as a pre-prodrug. In embodiments where the biologically active agent is itself a prodrug, at least further chemical modification step/s may then be necessary before the amphiphile prodrug is converted to the biologically active form.

In one embodiment, A is a therapeutically active nucleoside agent, preferably a nucleoside agent including a cytosine base, more preferably gemcitabine.

Preferably, the amphiphile is an enzymatic substrate for an enzyme that promotes formation of the biologically active form of the biologically active agent present in the amphiphile. It is preferable that the amphiphile is predetermined to be one which may be acted upon by an enzyme present in the patient. More preferably the enzyme acts on the cleavable linker.

In one preferred embodiment, the general formula (I) represents a compound according to formula (II):

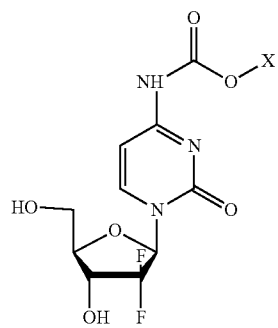

Gemcitabine prodrug structure where X is as defined as in Formula (II) above and is a molecule capable of conferring self-assembly properties to the compound. In a preferred embodiment, X is a substituent according to formula (a) or (e) for a prodrug of formula (II). Preferably, R is alkyl, alkenyl, alkynyl or isoprenoid of chain length between 12-24 carbon atom. Preferably, Y is amide or carbamate, more preferably carbamate. Preferably, S is $PEG_n$ wherein n=1-10, more preferably n=1-6, more preferably n=3-6.

In particularly preferred embodiments, the general formula (II) represents a compound selected from the group consisting of:

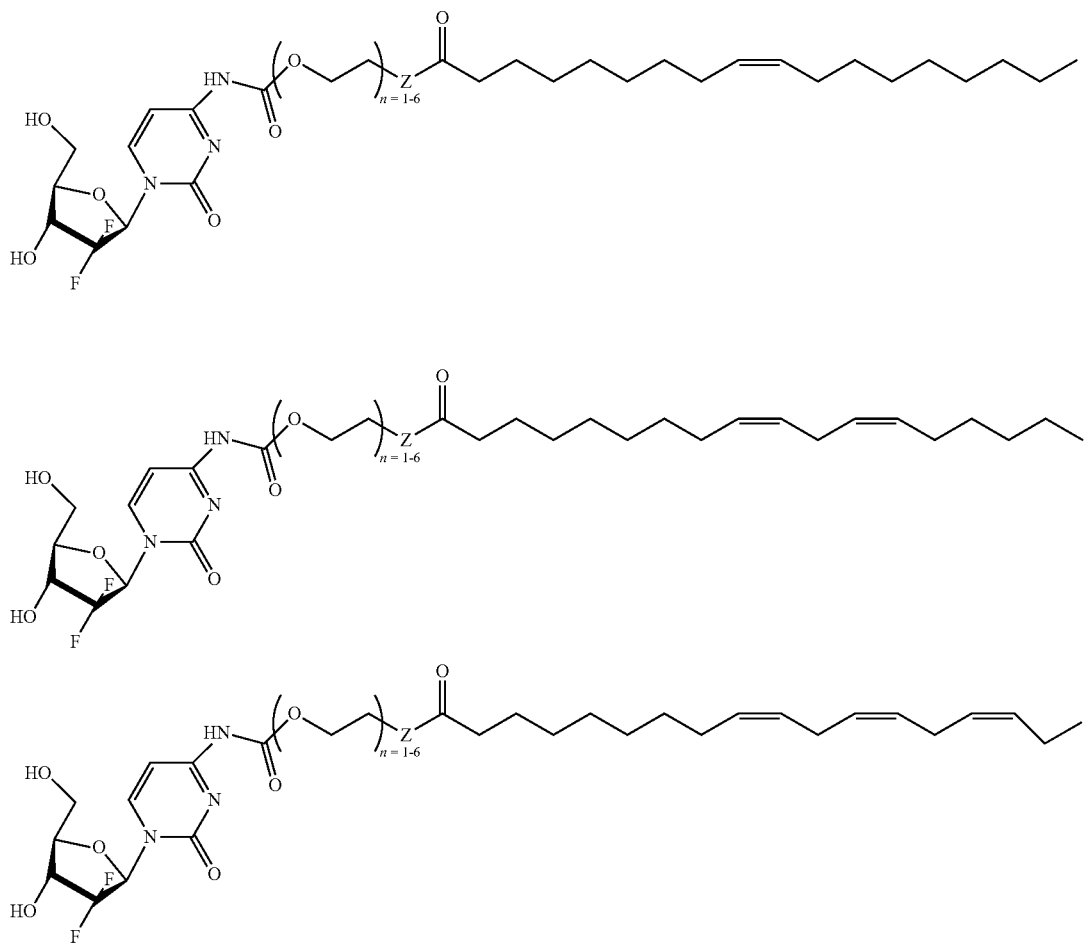

-continued

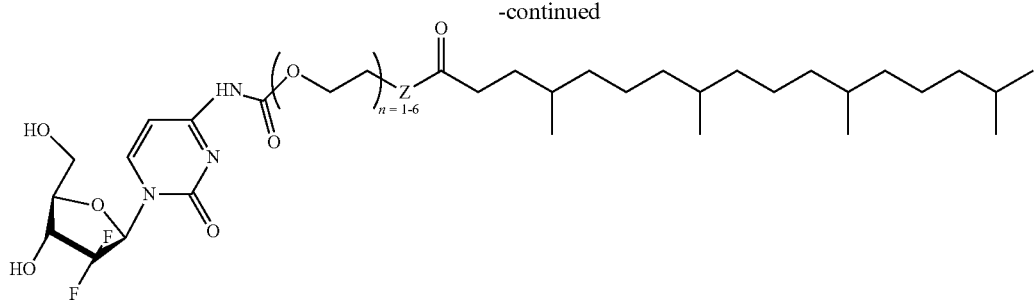

wherein Z is O or NH.

More preferably, the general formula (II) represents a compound selected from the group consisting of:

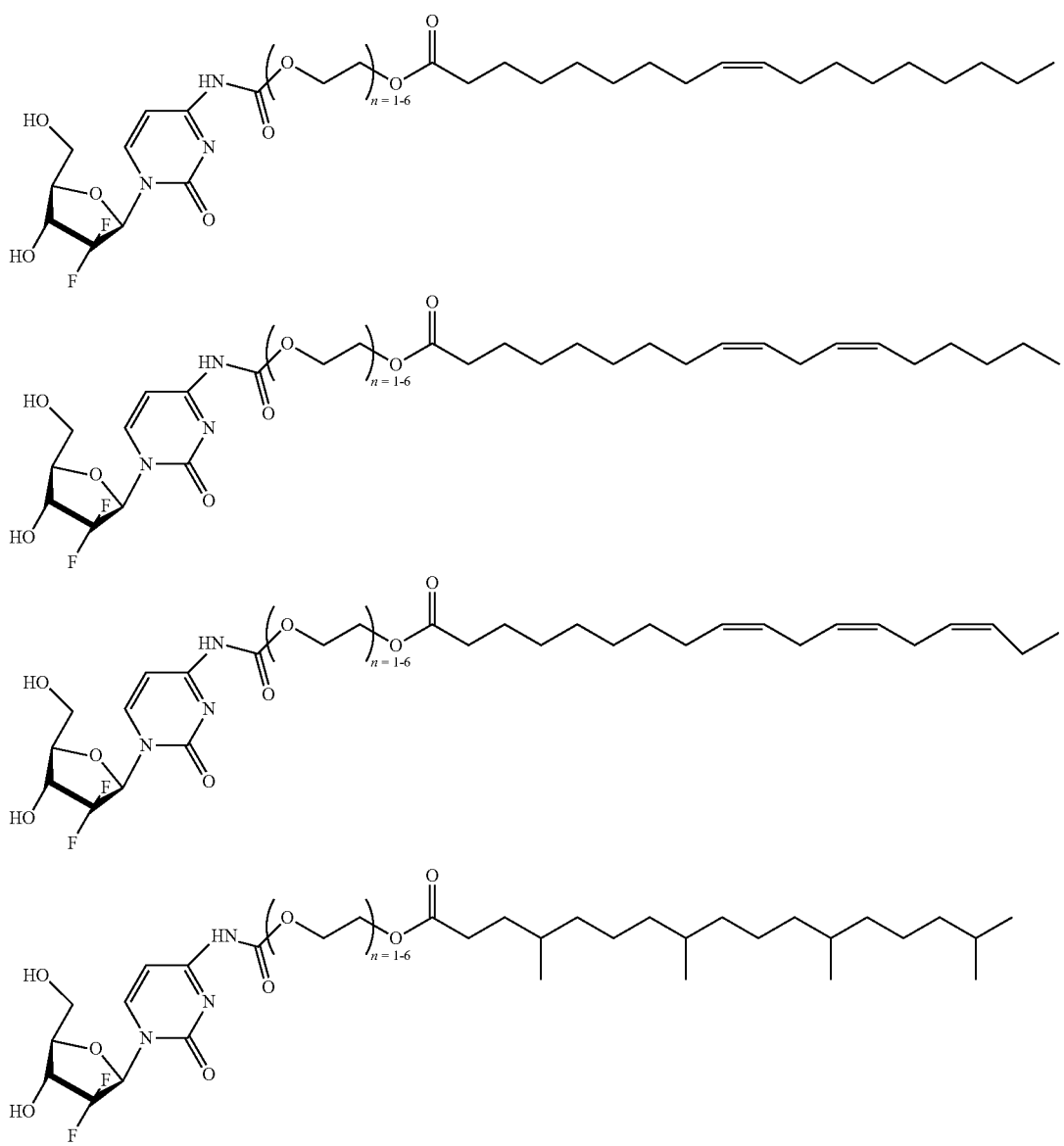

Particularly preferred embodiments of the compounds of the present invention are 2'-deoxy-2',2'-difluoro-$N^4$-(3,7,11, 15-tetramethylhexdecanyl-1-oxycarbonyl)cytidine (Gem-Phy), 2'-deoxy-2',2'-difluoro-$N^4$-(cis-9-octadecenyl-1-oxycarbonyl)cytidine (Gem-Ole), 2'-deoxy-2',2'-difluoro-$N^4$-(cis-9, cis-12-octadecadien-1-oxycarbonyl)cytidine (Gem-Lle), 2'-deoxy-2',2'-difluoro-$N^4$-(cis-6, cis-9, cis-1

2-octadecatrien-1-oxycarbonyl)cytidine (Gem-Lln), 2'-deoxy-2',2'-difluoro-N⁴-(triethyleneglycoxyl-cis-9-octadecenyl-1-oxycarbonyl) cytidine (Gem-PEG₃-Ole), 2'-deoxy-2',2'-difluoro-N⁴-(hexaethyleneglycoxyl-cis-9-octadecenyl-1-oxycarbonyl) cytidine (Gem-PEG₆-Ole), 2'-deoxy-2',2'-difluoro-N⁴-(hexaethyleneglycoxyl-cis-9,cis-12-octadecenyl-1-oxycarbonyl) cytidine (Gem-PEG₆-Lln), 2'-deoxy-2',2'-difluoro-N⁴-(tetraethyleneglycoxyl-cis-9,cis-12-octadecenyl-1-oxycarbonyl) cytidine (Gem-PEG₄-Lle) or 2'-deoxy-2',2'-difluoro-N⁴-(diethyleneglycoxyl-cis-9, cis-12-octadecenyl-1-oxycarbonyl)cytidine (Gem-PEG₂-Lle), or their pharmaceutically acceptable forms including solvates, hydrates, and salts.

Preferably, a prodrug of general formula (I) or (II) is capable of forming a self-assembled structure having a lyotropic phase that displays lamellar, cubic, hexagonal, sponge, emulsion, or crystalline lamellar morphologies. More preferably, the phase is a lamellar, cubic, hexagonal, or sponge phase. More preferably still, the phase is an inverse phase.

In some embodiments, a prodrug of the formula (I) or (II) may be used in combination with other phospholipids, cholesterol, glycerol lipids, or other prodrug amphiphiles or a hydrophobic drug in self-assembled structures to form nanoparticles with the capability to deliver combined chemotherapeutics or combined chemotherapeutics and diagnostics.

In some embodiments, a prodrug of the formula (I) or (II) may be used in combination with a targeting ligand, including a targeting molecule, peptide, antibody, protein or aptamer, to more efficiently delivery the active to the target.

In a particularly preferred embodiment, the self-assembled structures are of compounds Gemcitabine of formula (II) optionally in combination with other phospholipids, cholesterol, glycerol lipids, or other prodrug amphiphiles in self-assembled structures. Such structures may be suitably stabilised for pharmaceutical use benefitting from a surfactant stabiliser such as poloxamer, Pegylated lipids and polysorbate.

A preferred embodiment according to the current invention is a self-assembled structure comprising the compounds according to formula (II) above. Preferably the self-assembled structure is of the form lamellar, cubic, hexagonal and sponge phases. Where the self-assembled structure is of the form of a nanoparticle, the average particle size is preferably between 10-500 nm, more preferably 10-200 nm.

Reaction conditions for the synthesis of compounds according to the current invention would be readily determined by one of ordinary skill in the art with a minimum amount of experimentation, and are also exemplified in the accompanying examples. In a particularly preferred embodiment, the compounds are prepared according to scheme 1:

Scheme 1

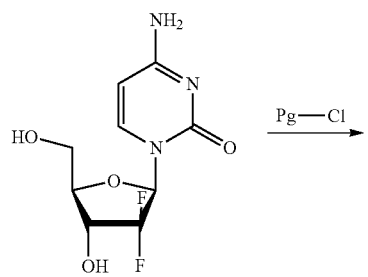

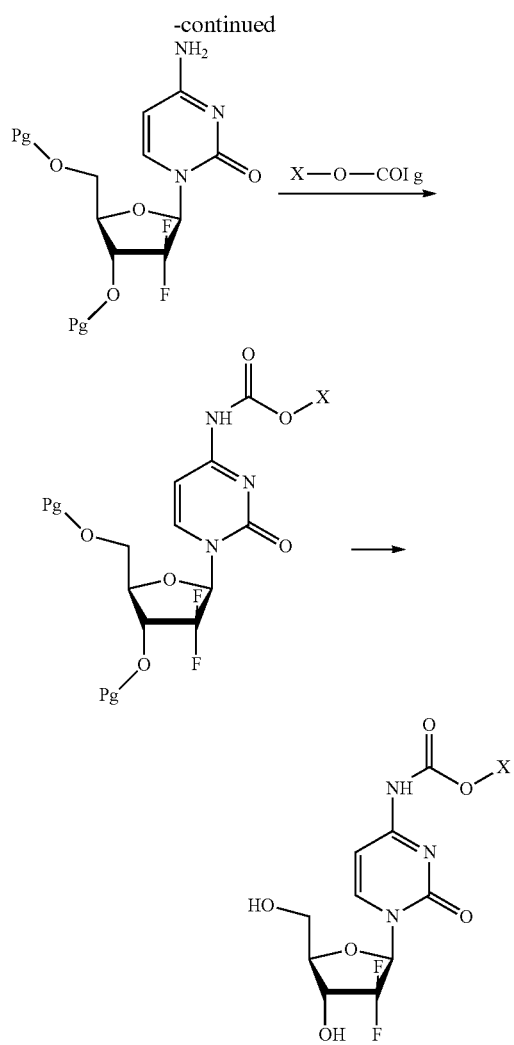

Where X is defined as herein described: Lg is a leaving group that is preferably a halide or pseudo-halide, and is most preferably chloride, and Pg is a protecting group that is preferably Trimethylsilyl group. The selection of the protecting group will readily be determined by one ordinary skill in the art with a minimum amount of experimentation, and is also exemplified in the accompanying examples.

Reaction conditions for the synthesis of compounds according to the current invention would be readily determined by one of ordinary skill in the art with a minimum amount of experimentation, and are also exemplified in the accompanying examples.

The starting materials and reagents used to synthesise the compounds according the current invention are either available from commercial suppliers such as, for example, the Chemical Company Sigma-Aldrich Chemical Company (St. Louis, MO), and Merck (Australia), unless otherwise mentioned or are prepared by methods known to those of ordinary skill in the art.

Another preferred embodiment according to the current invention is a self-assembled structure comprising according to formula (II), wherein A is another therapeutic nucleoside such as different forms of gemcitabine, such as Cyatrabine and 5-Fluorocytosine.

Formula III

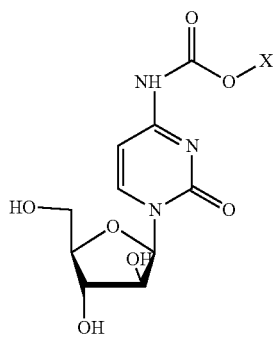

Where X is as defined as in Formula II and X is a molecule capable of conferring self-assembly properties to the compound.

The self-assembled structures of the current invention represent a desirable prodrug delivery system, owing to their modified release properties relative to prodrugs that do not undergo self-assembly into lamellar, inverse cubic, inverse hexagonal and inverse sponge and micellar phases. Without wishing to be bound by theory or mode of action, it is believed that the self-assembled structures of the current invention possess modified release properties firstly, due to the differences of the hydrolytic effect on the self-assembled amphiphile molecules and the complexity of access to single molecules in a self-assembly system compared with that of the isolated single molecules in a non-assembled systems. Secondly, in the case of the preferred compounds it is believed that the hydrophobic tail R and the spacer S of the preferred prodrugs result in compounds with less favourable substrate activity for the first enzyme required to convert the prodrug, and its analogues to gemcitabine or cyatrabine or 5-Flurocytidine, and thus resulting in a modified release profile for the compounds according to the current invention. Lastly, it is also believed that the hydrolysis of the compounds of the current invention releases fatty chain moieties that may, in itself form self-assembled structures which in turn may alter the local environment of the enzymatic reaction and consequently affecting enzymatic behaviour.

It is further similarly believed that the self-assembled structures according to the current invention are more desirable than prodrug self-assembled structures that display micellar morphologies. The prodrug lamellar, cubic, hexagonal, sponge phases or inverse micellar nanoparticles according to the current invention possess much greater amphiphile: solvent interface area than any of the previously disclosed prodrug self-assembled structures. Furthermore, unlike normal micelles, the inverse phases according to the current invention are stable in excess aqueous solvent.

In one embodiment, the self-assembled structures of the current invention comprise at least one solvent domain and at least one amphiphile domain, wherein the amphiphile domain comprises at least one of the compounds of according to formula (II) or (Ill), where X is defined as any group capable of conferring self-assembly properties to the prodrug.

The solvent domain of the current invention comprises at least one polar solvent. Examples of polar solvents include solvents conventionally used for amphiphile self-assembly, such as, for example, but are not limited to the following: water, glycerol, propylene glycol, butylene glycol, N-methylformamide, hydrazine, propylene carbonate, methanol, ethanol, and selected ionic liquids such as ammonium nitrate, and mixtures thereof.

The solvent may also comprise other components, including e.g. salts, pH buffering agents, sugars such as glucose and sucrose as well as stabilizing reagents such as polysorbate 80 and PEG-PPO-PEG copolymer and more specifically Poloxamer 127, Poloxamer 108, PEG-lipid chains of various Peg length or lipid chains, such as PEG4000-oleoyl, PEG4000-linoleoyl, PEG2000-oleoyl, PEG2000-linoleoyl, PEG10000-oleoyl or PEG10000-linoleoyl.

In some embodiments, a prodrug of the formula ((I) or (II) or (Ill)) will be used in combination with other phospholipids, cholesterol, glycerol lipids, or other prodrug amphiphiles in a self-assembled structure selected from liposomes, cubosomes, hexosomes, inverse micellar and sponge-like nanoparticles.

Pharmaceutically active agents that are capable of being incorporated into an amphiphile drug delivery vehicle are known to a person skilled in the art. See, for example, WO 2005/0210046 (DBL Australia Pty Ltd) and WO9830206. Examples of pharmaceutically or biologically active agents that may be incorporated into the vehicle include but are not limited to: global proteins and glycoproteins, highly reactive lipids such as prostaglandins, bioactive large drug molecules such as proteins, polysaccharides, DNA and RNA and smaller drug molecules such as cyclosporine, paclitaxel, indomethacin, fenofibrate, progesterone, amphotericin B (AMB) and irinotecan.

The self-assembled structures of the current invention may also comprise at least one other component intended to stabilise the self-assembled structure.

Examples of stabilising reagents are triblock copolymers of PEG-PPO-PEG of different building blocks and more specifically poloxamer 407, Poloxamer 127, Poloxamer 108, as well polysorbate 80, PEG-lipid chains of various Peg length or lipid chains, such as PEG4000-oleoyl, PEG4000-linoleoyl, PEG2000-oleoyl, PEG2000-linoleoyl.

It will be recognised by one skilled in the art that the formation of the desired lyotropic liquid crystalline phases of the current invention require a stringent balance between the specific hydrophilic and hydrophobic domains. Accordingly, the person of ordinary skill in the art will recognise that the selection of X in relation to A will dictate whether the prodrug of the current invention will form either the lyotropic phases and/or the solid lipid particles according to the current invention.

In general, the interplay between surfactant head group, tail and volume is very important in determining lyotropic phase behaviour. The relationship between the molecular geometry and phase behaviour can be described by the critical packing parameter (CPP). CPP is defined as $CPP=v/a_0 l_c$, where v is molecular volume, $a_0$ is the cross-sectional area of the surfactant head group, and $I_c$ corresponds to the hydrophobic tail length. Since the development of this formula, CPP has been used widely in predicting the mesophase behaviour based on the curvature of the molecule. For a molecule with a small head group and a bulky hydrophobe, the CPP value would be greater than 1, thereby inducing a mean negative interfacial curvature and potentially formation of an inverse mesophase.

The cleavable tail according to the current invention is selected based upon formation of a CPP greater than one when considered in context of the head group according to the current invention. FIG. 1 illustrates this interplay between the head and tail groups. The phases to the left of the lamellar phases have a critical packing density of less than 1 and often they happen at lower concentrations of the amphiphiles. The phases to the right of the lamellar phases have a CPP of more than 1 and usually occur at higher concentration of the amphiphiles. The CPP is not constant for an amphiphile molecule and changes with external factors such as temperature, pressure, concentration of the amphiphile and pH, as well as some additional solvents and additives. However, still this parameter can be used as a simple speculation of the phases that may occur upon hydration of the amphiphiles at room temperature or physiological temperature and at physiological pHs and pressure.

The self-assembly behaviour of amphiphiles in solvent arises because of the preferential interaction between the solvent and either the hydrophilic or hydrophobic portion of the amphiphilic molecules. When an amphiphile is exposed to a polar solvent, the hydrophilic portion of the amphiphile tends to preferentially interact with the polar solvent, resulting in the formation of hydrophilic domains ('solvent domain'). The hydrophobic portion of the amphiphile molecules tend to be excluded from this domain, resulting in the formation of a hydrophobic domain ('hydrophobic domain').

Lyotropic liquid crystals are formed by addition of a solvent to an appropriate solid or liquid amphiphile. They may be classified in terms of the curvature of the interface between the hydrophilic and hydrophobic domains. The curvature between these domains is dependent upon several factors, including the concentration and molecular structure of the amphiphile. When the interface displays net curvature towards the hydrophobic domain, the phase is termed 'normal'. When the interface displays net curvature towards the hydrophilic domain, the phase is termed 'inverse'. If the net curvature of the system approaches zero, then the resulting phase may possess a lamellar-type structure that consists of planar amphiphile bilayers separated by solvent domains. Alternatively, the net curvature may approach zero if each point on the surface is as convex in one dimension as it is concave in another dimension; such phases are referred to as "bicontinuous cubic" phases. Examples of particular phases that can be formed by self-assembled structures include but are not limited to: micellar (normal and inverse), hexagonal (normal and inverse), lamellar, cubic (normal, inverse and bicontinuous), and other intermediate phases such as inverse micellar cubic, the ribbon, mesh, or noncubic 'sponge' bicontinuous phases.

The bulk phases described above may be dispersed to form colloidal particles that retain the internal structure of the non-dispersed bulk phase. These colloidal particles have also been investigated for their application as drug delivery vehicles. U.S. Pat. No. 5,531,925 discloses colloidal particles comprising an interior of an amphiphilic-based phase, surrounded by a surface phase anchored to the bi- or mono-layer of the interior phase. The interior phase of the particles may be selected from lamellar, inverse cubic, hexagonal or $L_3$ ("sponge") phases, or mixtures thereof.

When these particles possess the internal structure of an inverse bicontinuous cubic phase, the particles are colloquially referred to as cubosomes. Similarly, when the particles possess the internal structure of an inverse hexagonal phase, they are referred to as hexosomes. When the particles possess the internal structure of a lamellar phase, they are referred to as liposomes. Colloidal particles may also be formed from 'sponge' phases.

An alternative drug delivery vehicle is solid-lipid particles. Solid lipid particles are comprised of a crystalline amphiphile core stabilised by a surfactant surface layer, such as polysorbate 80, poloxamer and pegylated lipids. Solid lipid particles have been used as carriers for hydrophobic drugs. For example, Camptothecin, an anticancer agent which was adsorbed on the solid lipid and dispersed as SLNs demonstrated increased drug levels in the brain tissues (Yang 1999, J. control release, 59(3):299-307). The drug loading of conventional SLN is however limited by the solubility of drug in the lipid melt and the structure of lipid matrix.

In an effort to increase drug loadings, the "pharmacosome" approach has been employed. This approach involves generating a prodrug that is capable of assembling into a micelle or liposome. Jin et al. identify some lipid-nucleoside analogues that can form normal lamellar vesicles (2005, 2006) or higher ordered nanostructures (WO2010063080 A1, U.S. Pat. No. 8,603,999 B2). However, micelles possess substantial drawbacks as phases suitable for drug delivery. Micellar systems can disintegrate under dilution and below the critical micelle concentration (CMC).

Bulk Phases

In one aspect, the self-assembled structure of the current invention comprises at least one bulk phase.

The bulk phase of the current invention comprises at least one phase selected from the following group: normal hexagonal, normal micellar cubic, normal bicontinuous cubic, lamellar, inverse bicontinuous cubic, $L_2$ 'inverse micellar cubic', $L_3$ 'sponge', and inverse hexagonal. Preferably, the bulk phase comprises at least one phase selected from the group consisting of inverse hexagonal, inverse cubic phase, $L_2$ 'inverse micellar cubic', $L_3$ 'sponge' phase and lamellar phases. Most preferably, the bulk phase comprises lamellar, inverse hexagonal and inverse cubic phase.

In a preferred embodiment, the bulk phases according to the current invention may be readily product at a temperature range of about room temperature to about 50° C. and be stable within this temperature range for at least several months.

A preferred embodiment according to the current invention are bulk lyotropic inverse phases. The thermodynamic stability of the lyotropic phases according to the present invention to dilution in excess aqueous solvent means that the bulk phase maintains its primary higher ordered structure, although the lattice parameter might be changed due to the swelling of the amphiphile in water. Most preferably, the lyotropic phase according to the current invention is a lamellar, an inverse bicontinuous cubic phase, or sponge mesophases.

It will be recognised by one skilled in the art that the observed lyotropic phase is dependent upon temperature. The bulk phases according to the current invention are stable between room temperature and physiological temperature, are preferably stable at temperatures from about 35° C. to about 40° C. and are most preferably stable from about 35° C. to about 37° C.

Processes for preparing bulk phases according to the current invention are known to those skilled in the art. In one embodiment, bulk phases according to the present invention may be prepared by dissolving each amphiphile in an appropriate buffer to the appropriate concentration. Examples of appropriate buffers include but are not limited to physiologically acceptable buffers, such as, for example, phosphate, phosphate buffered saline (PBS), tris(hydroxymethyl)aminomethane (Tris), 4-(2-hydroxyethyl)-1-piperazineethanesulfonic acid (HEPES), Tris-sucrose, Tris-glycine, and glycine buffers.

In another embodiment, the preferred phases according to the current invention are prepared by mechanically mixing molten lipid between room temperature −50° C. until a visually homogenous sample are obtained. Optionally, addition of a co-solvent such as, for example, ethanol in the range of 10-20% by weight may assist the homogenisation process.

Colloidal Particles: Colloidosomes or Nanoparticles

A further aspect of the invention relates to self-assembled structures of the current invention that comprise one or more particles that retain the internal structure of the bulk phase. Such particles are referred to as "colloidosomes" or "nanoparticles".

In one embodiment, the self-assembled structures of the current invention comprise colloidosomes or selected from the following group: liposomes, cubosomes, hexosomes and "sponge-like' particles. In a preferred embodiment, the colloidal particles are selected from the following group: liposomes, cubosomes, hexosomes, and sponge-like particles most preferably, the colloidal particles are liposomes and cubosomes, and sponge like particles.

In a particularly preferred embodiment according to the current invention, the colloidosomes are derived from a lamellar and inverse phase. The thermodynamic stability of the lyotropic phases according to the present invention means that the bulk phases can progressively be diluted in excess aqueous solvent and dispersed into colloidosomes while maintaining the same liquid crystalline structures as that of bulk phases.

The colloidosomes according to the current invention may be prepared according to processes known to those skilled in the art. For example, colloidosomes/nanoparticles may be prepared by hydration of a thin lipid film in water or saline solution (e.g., phosphate buffered saline). In addition sugars such as glucose, dextrose might be added to the media. Inverse phase colloidosomes such as inverse cubosomes and hexosomes may be hydrated in water to form gel like bulk phases that can be consequently dispersed into particles by using shear forces such as sonication and high pressure homogenisation in the presence of stabilising agents.

It will be recognised by one of ordinary skill in the art that in order to prepare stable colloidosomes it is necessary to add a stabilisation agent or fragmentation agent. Suitable fragmentation agents are known to those skilled in the art and include, for example, poloxamer or polysorbate or pegylated lipids. Poloxamer is the most widely used stabilising agents for inverse phase colloidosomes and is a block copolymer of polyethylene glycol (PEG) and polypropylene oxide (PPO). In a preferred embodiment according to the current invention, the stabilising agent are triblock copolymers of PEG-PPO-PEG of different building blocks. In a particularly preferred embodiment according to the current invention, the stabilisation agent is poloxamer 407, poloxamer 108, and Pegylated lipids (PEG2k-10K-oleoyl).

In one embodiment, colloidal particles are prepared by dispersing a bulk phase. The bulk phases of the current invention may be dispersed by dropwise addition of an ethanolic solution of the bulk phases into water containing a stabilising reagent. Alternatively, the bulk phase may be dispersed by adding water containing at least one stabilising reagent to the bulk phases. The size of these particles can be controlled by means of vortexing, sonication, filtration, extrusion and homogenisation, techniques well known to one skilled in the art.

In a preferred embodiment, colloidosomes or nanoparticle dispersions according to the current invention are prepared by preferably dispersing the bulk phases of the prodrug-amphiphile mixture with water containing a stabilising reagent using vortexing, and shear forces, such as probe-type ultrasonic homogeniser or an ultrasonic bath. The colloidosome prepared according to this embodiment may optionally be subject to one or more additional processing steps. Such processing methods are known to those skilled in the art and include high pressure homogenisation, and stepwise extrusion through membranes. The membranes employed for stepwise extrusion may possess pore sizes including, for example, 0.8, 0.4, 0.2, 0.1 and 0.05 µm. In one embodiment, the processing step is a size selection process.

In a preferred embodiment, the course colloidosomes or nanoparticles preparation is further processed by means of passing through a series of polycarbonate (PC) membranes. The size range of the membranes will be selected by a person skilled in the art according to the desired particle size of the final product. The equipment which may be used for this processing step are known to those skilled in the art, but may include, for example, an extruder.

It will be recognised by the skilled addressee that the size of the nanoparticles of the current invention will depend upon the intended use. For example, for intravenous administration the preferred colloidosome size range is commonly between about 30 nm and about 400 nm. More preferably, the size range is between about 30 nm and about 200 nm for intravenous application.

For delivery of nanoparticles into specific organs such as liver and passive targeting to tumours, particle sizes of between about 30 nm to about 400 nm are contemplated. More preferably particle sizes are about 30 nm to less than about 200 nm. Without wishing to be bound by theory, it is believed that particles of the size between 30-200 nm are passively targeted to cancer cells, owing to their enhanced permeation and retention time in the leakier and chaotic neovasculature of solid tumours. See, for example Brannon-Peppas L. et al (Brannon-Peppas 2012 and Matsumura et al.)[7,1].

Colloidal Particles: Solid Lipid Particles

A preferred aspect of the current invention seeks to provide solid-lipid particles comprised of at least one gemcitabine prodrug.

Solid lipid particles according to the current invention may be manufactured by processes known to those skilled in the art. See, for example, Mehnert and Mäder. (Mehnert 2001)[8].

The appropriate process used to manufacture solid lipid particles according to the current invention may be selected according to the physicochemical properties of the prodrug of the current invention. It will be recognised by one skilled in the art that some of the typical methods to manufacture solid lipid particles, for example those methods that require the lipid to be melted whilst in an aqueous solution, are not applicable to the prodrugs according to the current invention that possess a melting point higher than 100° C.

In one embodiment, the solid lipid particles of the current invention are prepared according to mechanical methods. According to this embodiment, one or more stabilisers are added to the neat amphiphile. Examples of stabilisers include but are not limited to: triblock polymers (for example, poloxamer 407, poloxamer 108, and pegylated lipids). The amount of stabiliser added to the neat amphiphile may be between about 5-30% (w/w), is preferably between about 10-30% (w/w) and is most preferably between about 15-30% (w/w). To prepare the initial bulk phases, usually 20-30% of water by weight is added to the amphiphile, usually at room temperature (about 22 to about 25° C.). The amphiphile-water mixture is then sheared using methods known to those skilled in the art. In a preferred embodiment, the amphiphile-water mixture is sheared using rough homogenization. The mixture may then undergo further processing to produce particles of desirable size and polydispersity. Methods of further processing are known to those skilled in the art and may include, for example, high pressure homogenization, ultrasonication, and extrusion through different membranes with known pore sizes.

Pharmaceutical Compositions

A further aspect of this invention relates to pharmaceutical compositions of the current invention. In one embodiment, the pharmaceutical composition according to the present invention comprises at least one of compounds according to formula (I). In another embodiment, the pharmaceutical composition comprises at least one self-assembled structure according to the current invention. In a further embodiment, the composition comprises at least one of the solid-lipid particles of the current invention.

In one embodiment, the pharmaceutical composition according to the current invention may be freeze-dried, spray freeze dried, lyophilised or spray-dried powder.

Pharmaceutical compositions according to the present invention may include pharmaceutically acceptable carriers, excipients, diluents, additives and vehicles selected based upon the intended form of administration, and consistent with conventional pharmaceutical practices. Suitable pharmaceutical carriers, excipients, diluents, additives and vehicles are known to those skilled in the art and are described in publications, such as, for example *Remington: The Science and Practice of Pharmacy*.

The pharmaceutical compositions according to the present invention may further include adjuvants that include, but are not limited to: preservatives, wetting agents or antimicrobial agents. Other adjuvants include but are not limited to: cryoprotectants, spray drying adjuvants, buffers, isotonically adjusting agents, and pH adjusting materials.

The amount of active ingredient that may be combined with the carrier materials to produce a single dosage form will vary depending upon the host treated and the particular mode of administration. Dosage unit forms will generally contain between from about 1 mg to about 5,000 mg of an active ingredient, preferably contain between 20 and 1,000 mg of an active ingredient, and most preferably between 100 and 750 mg of an active ingredient.

It will be understood that reference to the mass of the active ingredient refers to the mass of the gemcitabine prodrug, and not the mass of self-assembled structures or solid lipid particles thereof.

Methods of Treatment

Another aspect of this invention relates to use of a self-assembled structure, solid lipid particle or pharmaceutical compositions thereof according to the present invention for the inhibition of tumour growth. In a preferred embodiment, a pharmaceutical composition of the current invention is used to inhibit growth of solid and metastatic tumours. In a particularly preferred embodiment, a pharmaceutical composition according to the current invention is used to inhibit growth of solid or metastatic tumours associated with pancreatic cancer, colon cancer, colorectal cancer or breast cancer.

In one embodiment there is provided a method of treating or preventing cancer in an individual, including administering to a person in need thereof a self-assembled structure according to the invention.

'Treatment' generally refers to both therapeutic treatment and prophylactic or preventative measures.

The objective or outcome of treatment may be to reduce the number of cancer cells; reduce the primary tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the disorder.

Efficacy of treatment can be measured by assessing the duration of survival, time to disease progression, the response rates (RR), duration of response, and/or quality of life.

In one embodiment, the method is particularly useful for delaying disease progression.

In one embodiment, the method is particularly useful for extending survival of the human, including overall survival as well as progression free survival.

In one embodiment, the method is particularly useful for providing a complete response to therapy whereby all signs of cancer in response to treatment have disappeared. This does not always mean the cancer has been cured.

In one embodiment, the method is particularly useful for providing a partial response to therapy whereby there has been a decrease in the size of one or more tumors or lesions, or in the extent of cancer in the body, in response to treatment.

In another embodiment, there is provided a method of providing a prodrug of an an active drug in vivo to an individual in need thereof, preferably the active drug is gemcitabine, wherein the prodrug undergoes bioconversion for example, by hydrolytic, oxidative, reductive or enzymatic cleavage to the active drug, preferably at the desired site of action (such as a tumour). The prodrug may exhibit one of more characteristics when compared with the active drug: reduced systemic toxicity, improved pharmacokinetics and/or pharmacodynamics, and improved stability in biological fluids. The prodrug may enable delivery of higher payloads of the active drug, and protect the active drug from premature deactivation, resulting in increased efficacy and reduced systemic toxicity. Preferably, the prodrug is provided in the form of a self-assembled structure. More preferably, the self-assembled structure comprises an additional component selected from the group consisting of: phospholipids, cholesterol, glycerol lipids, prodrug amphiphiles, and combinations thereof. Most preferably, the self-assembled structure comprises an additional component selected from the group consisting of: phospholipids, cholesterol, and combinations thereof.

It will be recognised that the intended form of administration of the self-assembled structure will be as either its bulk phase, as colloidal particles derived therefrom or as solid-lipid particles.

The dosage regimen of a self-assembled structure, solid lipid particle or pharmaceutical compositions thereof according to the current invention will vary depending upon known factors such as the pharmacodynamic characteristics of the compounds, self-assembled structures, colloidal particles and compositions thereof of the current invention, and their mode and route of administration; the age, sex, health, medical condition, and weight of the patient, the nature and extent of symptoms, the kind of concurrent treatment, the frequency of treatment, the renal, hepatic and cardiovascular and otherwise general health status of the patient in need of such treatment, and can readily be determined by standard clinical techniques.

It will be understood that the invention disclosed and defined in this specification extends to all alternative combinations of two or more of the individual features mentioned or evident from the text or drawings. All of these different combinations constitute various alternative aspects of the invention.

The examples that follow are intended to illustrate but in no way limit the present invention.

Materials:

All solvents were of analytical grade and purchases from Merck Australia. All reagents were obtained from Sigma-Aldrich. Gemcitabine was purchased from Xingcheng Chempharm Co., LTD, China. Fatty acids and alcohols were purchased from Nucheck Prep INC. (MN, USA). t-Boc-amino $(PEG)_3$_alcohol linker was purchased from Leo Biochem (china). DiD' (1,1'-Dioctadecyl-3,3,3',3'-Tetramethylindodicarbocyanine, 4-Chlorobenzenesulfonate Salt) was purchased from molecular probe (Life Technologies).

Instrumentation:

Nuclear magnetic resonance (NMR): The $^1$H NMR spectra (200 MHz) were recorded on a Bruker AC400 spectrometer in deuterated solvent with Tetramethylsilane $((CH_3)_4Si$, TMS) as internal standard unless otherwise stated. Solute concentrations were approximately 15 mg/ml in standard 5 mm NMR tubes. The spectra were analysed using mNova software. The chemical shift values (δ) were expressed in ppm, coupling constants were expressed as J values, in Hertz units.

High performance liquid chromatography (HPLC): Analytical HPLC was performed on Waters HPLC equipment (Waters Corporation, Milford, MA, USA), comprising of a 600 solvent delivery system with a 600 automated gradient controller using a Phenomenex Gemini C18 column (5 µM, 4.6×150 mm) and an Altech 3300 Evaporative Light scattering (ELS) and a Shimadzu UV-Vis (A=260 nm) detectors. Mobile phases for the analysis of prodrug amphiphiles consisted of (A) 50:50 H2O/acetonitrile and (B) 60:40 THF/acetonitrile.

Flash column chromatography: Purification of prodrug amphiphiles was performed on a Reveleris® iES flash chromatography system (Grace Division Discover Sciences, Deerfield, IL, USA) using a Reveleris® C18 12 or 40 g, and 80 g columns. Mobile phases for the analysis of prodrug amphiphiles consisted of (Buffer A) H2O/Ethanol (90/10), (Buffer B) Ethanol.

Electrospray Ionization Mass Spectroscopy (ESI-MS): Electro-spray ionisation mass-spectroscopy (ESI-MS) was performed on a Finnigan LCQ Advantage MAX ion trap mass spectrometer (Thermo Electron Corporation, San Jose, CA, USA) equipped with ESI and APCI interface. Samples were injected using a syringe pump. Methanol was used as the mobile phase unless otherwise stated.

Samples were usually introduced dissolved in DCM. Solvents were removed using a rotary evaporator under reduced pressure with water bath temperature below 50° C.

Physicochemical Characterization

Differential Scanning Calorimetry (DSC): Differential scanning calorimetry (DSC) measurements were performed on a Mettler Toledo DSC 822 system with a Mettler TSO 801 RO sample robot (Mettler Toledo, Switzerland). Samples were prepared by weighing 4-8 mg of the samples into 40 µL aluminium crucibles and sealed. Samples were cooled to −130° C. before heating at a rate of 2.5° C./min up to 300° C. DSC thermograms were recorded using the STARe software package (Mettler Toledo, Switzerland). Indium was used for the calibration of the instrument.

Polarized Optical Microscopy (POM): Samples used for Polarized Optical Microscopy (POM) were prepared by placing a small amount of prodrug amphiphile on a microscope slide and covered with a cover slip. Water was placed on the edges of the cover slip and allowed to flow into the sample by capillary action. The microscope slide was placed in a Linkam PE94 hot stage (Linkam Scientific Instruments Ltd. Surrey, England) and heated at 3° C./min between room temperature and 50° C. The interaction of water and the amphiphile was observed with an OlympusGX51 inverted optical microscope (Olympus Australia Pty. Ltd.; Melbourne, Australia) in the presence and absence of crossed polarizing lenses. Images were captured with a Nikon DS-Ri-1 camera. All images were taken at 100× magnification.

Dynamic Light Scattering (DLS): Particle size distributions of the dispersions were analysed using a Malvern Zetasizer (Nano ZS, Worcestershire, UK) equipped with He-Ne Laser (4 mW, 633 nm). Disposable 40 µL cuvettes with a scattering angle of 90° were used for all the measurements. The samples were equilibrated for 1 min at 25° C. The viscosity and refractive index values were set to 0.8872 cP and 1.330 respectively for all the dispersions. Size distribution was recorded by intensity and by number.

Small Angle X-Ray Scattering (SAXS):

SAXS analyses of the bulk and lyotropic phases of the amphiphiles were performed on a Bruker NanoSTAR laboratory SAXS instrument (Brucker AXS, Kalsruhe, Germany).

The equilibrated lyotropic phases were placed into a demountable button sample cells. For the analysis of the dispersions, a multi-capillary holder was used. Button cells and capillary holder interchangeably fit into a block setup that was temperature-controlled with a Peltier heater-cooler system. 2D scattering images were radially averaged to conventional 1 D scattering plots and as a function of the q value (Å-1) where q is the length of the scattering vector which was calculated using the formula $q=(4\pi/\lambda)\sin(\theta/2)$, where λ is the wavelength and θ is the scattering angle.

The mesophases formed were determined by indexing peaks using the reflection laws as described by De Campo et al., Langmuir, 2004. 20(13), 5254-5261. Small angle X-ray scattering patterns of emulsions and liposomes display large broad peaks while liquid crystalline phases of highly ordered nanostructured particles such as cubosomes and hexosomes display distinct sharp peaks. The relative positions of the peaks ("spacing") allows for the elucidation of the symmetry of the structure. The interplanar distance (d) between two reflecting planes may be calculated using the formula $d=(2\pi)/q$, where q is the absolute position of the peak. This, in turn allows for the calculation of the lattice parameter (a), the size of the unit cell, to be calculated.

Example 1: Synthesis of 2'-deoxy-2',2'-difluoro-N4-(((cis-9, octadecenyl)oxy)carbonyl) cytidine (Gemoleyl)

Gemcitabine base (2.00 g, 7.60 mmol) was dissolved in a round bottom flask with DMF (10 mL). Anhydrous pyridine (3.06 mL, 38 mmol) was added to the solution and stirred using a magnetic stirrer over an ice bath. Chlorotrimethylsilane (4.82 mL, 38 mmol) was added to the solution dropwise and the reaction was stirred for one hour. The product showed a positive ion m/Z of 408. Oleyl chloroformate (2.56. g, 7.6 mmol, 1:1 molar ratio with gemcitabine) was dissolved in DMF (2 mL) and was added to the solution dropwise. The reaction was left to stir at room temperature for two hours. The reaction was quenched and the protecting silyl ether was removed at the conclusion of the reaction by the addition of deionized water (3 mL) followed by stirring for three hours. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 40 g in a preparative HPLC. The pure fractions were collected and evaporated to dryness to give 2.30 g of a white wax (yield: 54.3%). 1H NMR (400 MHz, DMSO-d6): δ 10.83 (s, 1H, —NHCO); 8.21 (d, 1H J=7.6 Hz, 6-CH); 7.09 (d, 1H J=7.6 Hz, 5-CH); 6.3 (b, 1H, 1'-CH), 6.16 (t, 1H, 5'-OH); 5.35-5.28 (m, 3H, CH=CH and 3'-OH); 4.18 (dt, 1H. 4'-CH); 4.09 (t, 2H, J=6.65 Hz, CO2-CH2); 3.8-3.67 (dd, 2H, 5'-CH2); 1.97 (q, 4H, —CH2-); 1.58 (m, 2H, —OH); 1.36-1.15 (m, 22H—CH2-); 0.84 (t, 3H, —CH3). ESI-MS (MeOH)+ve mode m/z: 558.10 [M+H]+, 1115.13 [2M+H]+.

Synthesis of Intermediate Compound

Example 1.1 Oleyl Chloroformate

The method used to synthesize of oleyl chloroformate was based on a modified version of the method reported by Ding and Fritz. Oleyl alcohol (5 g, 18.62 mmol) was combined with a 1/3 molar ratio of triphosgene (1.84 g, 6.02 mmol) in DCM (30 mL) and was stirred over an ice bath. Pyridine (1.5 mL, 18.62 mmol) was added drop-wise to the solution and stirred for one hour in the pre-cooled solution and for a further two hours at room temperature. The reaction mixture was then quickly extracted with ice cold water and dried over NaSO4. The solution evaporated resulting in an oil and used in further reactions without any further purification (4.81 g, 78% yield).

Example 2: Synthesis of 2'-deoxy-2',2'-difluoro-N4-((((cis-9,12,octadecadienenyl)oxy)carbonyl) cytidine (Gem-linoleyl)

Gemcitabine base (2.00 g, 7.60 mmol) was dissolved in a round bottom flask with DMF (10 mL). Anhydrous pyridine (3.06 mL, 38 mmol) was added to the solution and stirred using a magnetic stirrer over an ice bath. Chlorotrimethylsilane (4.82 mL, 38 mmol) was added to the solution dropwise and the reaction was stirred for one hour. The product showed a positive ion m/Z of 408. Linoleyl chloroformate (2.5 g, 7.60 mmol, was dissolved in DMF (2 mL) and was added to the solution dropwise. The reaction was left to stir at room temperature for two hours. The reaction was quenched and the protecting silyl ether was removed at the conclusion of the reaction by the addition of deionized water (6 mL) followed by stirring for three hours. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 12 g in a preparative HPLC. The mobile phase (A) 90:10 H2O/ethanol and (B) 100% ethanol.

The pure fractions were collected and evaporated to dryness to give 2.6 g of a pale-yellow wax (yield: 63.5%). 1H NMR (400 MHz, DMSO-d6): δ 10.82 (s, 1H, —NHCO); 8.21 (d, 1H, 6-CH); 7.10 (d, 1H, 5-CH); 6.16 (t, 1H, 5'-OH); 5.37-5.26 (m, 5H, CH=CH, 3'OH); 4.18 (q, 1H, 4'-CH); 4.10 (t, 2H, NHCO2-CH2); 3.89-3.78 (dd, 2H, 5'-CH2); 2.73 (t, 2H, —CH2-) 2.00 (q, 4H, —CH2-); 1.59 (m, 2H, —CH2-); 1.36-1.20 (m, 16H, —CH2-); 0.84 (t, 3H, —CH3). ESI-MS (MeOH) –ve mode m/z: 554.27 [M–H]–, 590.07 [M–H+Cl]–, 1109.13 [2M–2H]–.

Synthesis of Intermediate Compound

Example 2.1: Linoleyl Chloroformate

The method used to synthesize of linoleoyl chloroformate was based on a modified version of the method reported by Ding and Fritz.[180] Linoleyl alcohol (3.5 g 13.14 mmol) was combined with a 1/3 molar ratio of triphosgene (1.29 g, 4.35 mmol) in DCM (35 mL) over an ice bath. Pyridine (1.06 mL, 13.14 mmol) was added to the solution dropwise and the reaction mixture was stirred on ice for one hour and then for a further two hours at room temperature. At the conclusion of the reaction, the mixture was quickly extracted using ice cold water and the organic layer was combined and dried over Na2SO4. The mixture was then evaporated under reduced pressure resulting in a yellow oil and used in further reactions without any further purification (3.50 g, 81% yield).

Example 3: Synthesis of 2'-deoxy-2',2'-difluoro-N4-(((3,7,11,15-tetramethyl-hexadecyl)oxy)carbonyl) cytidine (Gem-phytanyl)

Gemcitabine base (2.00 g, 7.6 mmol) was dissolved in a round bottom flask with DMF (10 mL). Anhydrous pyridine (3.06 mL, 38 mmol) was added to the solution and stirred using a magnetic stirrer over an ice bath. Chlorotrimethylsilane (4.82 mL, 38 mmol) was added to the solution dropwise and the reaction was stirred for one hour. The product showed a positive ion m/Z of 408. Phytanyl chloroformate (2.74 g, 7.6 mmol) was dissolved in DMF (2 mL) and was added to the solution dropwise. The reaction was left to stir at room temperature for two hours. The reaction was quenched and the protecting silyl ether was removed at the conclusion of the reaction by the addition of deionized water (6 mL) followed by stirring for three hours. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 12 g in a preparative HPLC. The mobile phase (A) 90:10 H2O/ethanol and (B) 100% ethanol. The pure fractions were collected and evaporated to dryness to give 3.22 g of a white crystalline wax (yield: 72.1%). 1H NMR (400 MHz, DMSO-d6): δ 10.83 (s, 1H, —NHCO); 8.21 (d, 1H J=7.6 Hz, 6-CH); 7.10 (d, 1H J=7.6 Hz, 5-CH); 6.3 (b, 1H, 1'-CH), 6.15 (t, 1H J=7.5 Hz, 5'-OH); 5.25 (dd, 1H, 3'-OH), 4.25-4.07 (m, 3H, 4'-CH, NHCO2-CH2); 3.89-3.66 (dd, 1H 5'-CH2); 1.69-0.95 (m, 24H—CH, CH2); 0.90-0.77 (m, 15H, —CH3). ESI-MS (MeOH) –ve mode m/z: 586.10 [M–H]–, 621.95 [M–H+Cl]–, 1172.99 [2M–2H]–.

Synthesis of Intermediate Compounds

Example 3.1: 3,7,11,15-Tetramethyl-Hexadecyl Chloroformate

Phytanol (4.8 g, 16.35 mmol), and triphosgene (1.62 g, 5.46 mmol) were dissolved in 30 ml of dichloromethane, stirred and cooled on an ice bath. Anhydrous pyridine (1.3 g, 16.35 mmol) was added dropwise over a period of 1 hour. The reaction mixture was stirred for an additional 1 h at room temperature, and then quickly extracted with extra methylene chloride and ice water. The organic layer was pooled, dried over Na2SO4 and evaporated to dryness to yield 5.22 g (88.7%) of phytanyl chloroformate as yellow liquid. $^1$H NMR in CDCl$_3$: δ0.83, 0.85, 0.86, 0.88, (4s, each 3H, CH3), 0.91 (d, 3H, J=6.0 Hz, CH3), 0.95-1.40 (m, 20H, CH2), 1.39-1.68 (m, 4H, CH), 1.68-1.88 (m, 1H, OH), 4.27-4.47 (m, 2H, CH2OH).

Example 4: Synthesis of 2'-deoxy-2',2'-difluoro-N4-((((cis-9, octadecenoyl)oxy-triethyleneglycol)oxy) carbonyl) cytidine (Gem-PEG$_3$-Oleoyl)

Gemcitabine base (1.26 g, 4.8 mmol) was dissolved in 10 mL DMF. Anhydrous pyridine (2.0 mL, 24 mmol) was added to the solution and stirred using a magnetic stirrer over an ice bath. Chlorotrimethylsilane (2.61 mL, 24 mmol) was added to the solution dropwise and the reaction mixture was stirred for one hour. The product showed a positive ion m/Z of 408. Chloroformate solution of PEG$_3$-oleate (4.74 mmol) was dissolved in DMF (2 mL) and added to the reaction mixture dropwise. The reaction was left to stir at room temperature for two hours. The protecting silyl ether was removed at the conclusion of the reaction by the addition of deionized water (6 mL) followed by stirring for one hour. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 40 g in a preparative HPLC. The mobile phase (A) 90:10 H2O/ethanol and (B) 100% ethanol. The pure fractions were collected and evaporated to dryness to give 2.42 g of a white crystalline wax (yield: 72.1%). 1H NMR (400 MHz, DMSO-d6): δ 10.83 (s, 1H, —NHCO); 8.21 (d, 1H, 6-CH); 7.09 (d, 1H, 5-CH); 6.3 (b, 1H, 1'-CH), 6.16 (t, 1H, 5'-OH); 5.35-5.28 (m, 3H, CH═CH and 3'-OH); 4.25 (m, 2H, CH2-OCO), 4.18 (dt, 1H. 4'-CH); 4.09 (t, 2H, —CH2-OCO); 3.89-3.67 (dd, 1H, 5'-CH2); 3.67-3.45 (m, 8H, CH2-O,), 2.33 (t, 2H, CH2), 1.97 (dt, 4H, —CH2-); 1.48 (m, 2H, —CH2); 1.36-1.15 (m, 22H-CH2-); 0.84 (t, 3H, —CH3).
ESI-MS (MeOH)+ve mode m/z: 704[M+H].
Synthesis of Intermediate Compounds Example 4.1: Oleoyl-PEG$_3$ Oleic acid (5 g, 17.7 mmol), was dissolved in 50 mL DCM and cooled down in an ice bath. Oxalyl chloride (5 g, 39.39 mmol) was added dropwise to the reaction mixture. The reaction mixture was stirred for further 10 min in an ice bath and returned to room temperature and stirred for additional 2 h. The excess oxalyl chloride was removed and the residue was redissolved in DCM and evaporated to dryness to remove the oxalyl chloride and obtain an oily residue of oleoyl chloride.
Oleoyl chloride (2.8 g, 8.89 mmol) was dissolved in 20 mL DCM and precooled on ice. Triethyleneglycol (4.84 mL, 35.56 mmol) and TEA (1.28 mL, 8.89 mmol) were added to the reaction mixture. The pH was adjusted to 9 by adding TEA if required. The reaction mixture was stirred overnight. The product tested by ESI/MS showing the PEG$_3$-oleate to be dominant with an additional bis PEG oleate. The reaction mixture was evaporated under reduced pressure and the resulting residue was redissolved in DCM and extracted with water. The DCM phase was evaporated to dryness, redissolved in ethanol and purified using a Reveleris® C18 40 g in a preparative HPLC. The mobile phase (A) 90:10 H2O/ethanol and (B) 100% ethanol. The pure fractions were collected and evaporated to dryness to give 3.0 g of an oil (yield: 81.5%). ESI-MS (MeOH)+ve mode m/z: 415[M+H].

Example 4.2: Oleoyl PEG$_3$-chloroformate

PEG3-oleoyl (2 g, 4.76 mmol) and triphosgene (0.470 g, 1.58 mmol) were dissolved in 20 mL of dichloromethane, stirred and cooled on an ice bath. Anhydrous pyridine (0.3 mL, 7.24 mmol) was added dropwise to the reaction mixture and the reaction mixture was stirred for 30 min in ice bath, followed for 2 h at room temperature. The reaction mixture quickly extracted with extra methylene chloride and ice water. The organic layer was pooled, dried over Na2SO4 and evaporated to dryness and used for the next stage reaction with protected Gemcitabine.

Example 5: Synthesis of 2'-deoxy-2',2'-difluoro-N4-((((cis-9, cis-12-octadecadienoyl)-oxy-triethyl-eneglycol)oxy)carbonyl) cytidine (Gem-PEG$_3$-Linoleoyl)

Gemcitabine base (3.48 g, 13.2 mmol) was dissolved in 30 mL DMF. Anhydrous pyridine (5.4 mL, 66 mmol) was added to the solution and stirred using a magnetic stirrer over an ice bath. Chlorotrimethylsilane (8.32 mL, 66 mmol) was added to the solution dropwise and the reaction mixture was stirred for one hour. The product showed a positive ion m/Z of 408. Chloroformate solution of PEG3-linoleate (6.27 g, 13.2 mmol) was dissolved in DMF (6 mL) and added to the reaction mixture dropwise. The reaction was left to stir at room temperature for two hours. The protecting silyl ether was removed at the conclusion of the reaction by the addition of deionized water (12 mL) followed by stirring for one hour. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 40 g in a preparative HPLC. The mobile phase (A) 90:10 H2O/ethanol and (B) 100% ethanol. The pure fractions were collected and evaporated to dryness to give 6.27 g of a white crystalline wax (yield: 76%). 1H NMR (400 MHz, DMSO-d6): δ 10.83 (s, 1H, —NHCO); 8.21 (d, 1H, 6-CH); 7.09 (d, 1H, 5-CH); 6.3 (d, 1H, 1'-CH), 6.16 (t, 1H, 5'-OH); 5.55 (b, 3'OH) 5.35-5.28 (m, 4H, CH═CH); 4.25 (m, 2H, CH2-OCO), 4.18 (m, 4'-CH); 4.09 (t, 2H, CO2-CH2); 3.89 (dt, 1H. 4'-CH); 3.79-3.67 (dd, 1H, 5'-CH2); 3.67-3.45 (m, 8H, CH2-0), 2.7 (m, 1H, CH), 2.33 (t, 4H, CH2), 1.97 (m, 2H, —CH2-); 1.48 (m, 2H, —CH2); 1.36-1.15 (m, 18H—CH2-); 0.84 (t, 3H, —CH3).ESI-MS (MeOH)+ve mode m/z: [M+H]: 702.20, [M+Na]: 724.33.
Synthesis of Intermediate Compounds Example 5.1: Linoleoyl-PEG$_3$ Linoleic acid (5.61 g, 20 mmol), was dissolved in 50 mL DCM and cooled down in an ice bath. Oxalyl chloride (5 g, 40 mmol) was added dropwise to the reaction mixture. The reaction mixture was stirred for further 10 min in an ice bath and returned to room temperature and stirred for additional 2 h. The excess oxalyl chloride was removed and the residue was redissolved in DCM and evaporated to dryness to remove the Oxalyl chloride and obtain an oily residue of linoleoyl chloride.

Linoleoyl chloride obtained above was redissolved in 50 mL DCM and precooled in an ice bath. Triethyleneglycol (12 g, 80 mmol) and TEA were added to the reaction mixture and the pH was adjusted to 9. The reaction mixture was stirred overnight. The product tested by ESI/MS showing the $PEG_3$-liloleoyl to be dominant with an additional bis $PEG_3$-linoleoyl. The reaction mixture was evaporated under reduced pressure and the resulting residue was redissolved in DCM and extracted with water. The DCM phase was evaporated to dryness, redissolved in ethanol and purified using a Reveleris® C18 40 g in a preparative HPLC. The mobile phase (A) 90:10 H2O/ethanol and (B) 100% ethanol. The pure fractions were collected and evaporated to dryness to give 6.18 g of an oil (yield: 81.5%).

ESI-MS (MeOH)+ve mode m/z: 413[M+H].

Example 5.2: Linoleoyl-$PEG_3$-chloroformate $PEG_3$-linoleoyl (6.18 g, 15 mmol) and triphosgene (1.48 g, 5 mmol) were dissolved in 100 mL of dichloromethane, stirred and cooled on an ice bath.

Anhydrous pyridine (1.209 mL, 15 mmol) was added dropwise to the reaction mixture and the reaction mixture was stirred for 30 min in ice bath, followed for 2 h at room temperature. The reaction mixture quickly extracted with extra methylene chloride and ice water. The organic layer was pooled, dried over Na2SO4 and evaporated to dryness and used for the next stage reaction with protected Gemcitabine.

Example 6: Synthesis of 2'-deoxy-2',2'-difluoro-N4-(((cis-9, octadecenoyl)-oxy-hexaethyleneglycol)oxy)carbonyl) cytidine (Gem-$PEG_6$-Oleoyl)

Gemcitabine base (1 g, 3.80 mmol) was dissolved in 10 mL DMF. Anhydrous pyridine (1.52 mL, 19 mmol) was added to the solution and stirred using a magnetic stirrer over an ice bath. Chlorotrimethylsilane (2.15 mL, 19.0 mmol) was added to the solution dropwise and the reaction mixture was stirred for one hour. The product showed a positive ion m/Z of 408. Chloroformate solution of $PEG_6$-oleate (2.1 g, 3.8 mmol) was dissolved in DMF (6 mL) and added to the reaction mixture dropwise. The reaction was left to stir at room temperature for two hours. The protecting silyl ether was removed at the conclusion of the reaction by the addition of deionized water (12 mL) followed by stirring for one hour. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Reveleris® C18 40 g in a preparative HPLC. The mobile phase (A) 90:10 H2O/ethanol and (B) 100% ethanol. The pure fractions were collected and evaporated to dryness to give 0.73 g of a yellow wax (yield: 23%). 1H NMR (400 MHz, DMSO-d6): δ 10.83 (s, 1H, —NHCO); 8.21 (d, 1H, 6-CH); 7.09 (d, 1H, 5-CH); 6.3 (d, 1H, 1'-CH), 6.16 (t, 1H, 5'-OH); 5.35-5.28 (m, 2H, CH=CH, 3'-OH); 4.25 (m, 2H, CH2-OCO), 4.18 (m, 4'-CH); 4.09 (t, 2H, CO2-CH2); 3.79-3.67 (dd, 1H, 5'-CH2); 3.67-3.45 (m, 20H, CH2-0), 2.33 (t, 2H, CH2), 1.97 (m, 4H, —CH2-); 1.48 (m, 2H, —CH2); 1.36-1.15 (m, 22H—CH2-); 0.84 (t, 3H, —CH3). ESI-MS (MeOH)+ve mode m/z: [M+H]: 836.20, [M+Na]: 858.33.

Synthesis of Intermediate Compounds

Example 6.1: Oleoyl-$PEG_6$

Oleic acid (2.5 g, 8.85 mmol), was dissolved in 25 mL DCM and cooled down in an ice bath. Oxalyl chloride (2.5 g, 17.7 mmol) was added dropwise to the reaction mixture. The reaction mixture was stirred for further 10 min in an ice bath and returned to room temperature and stirred for additional 2 h. The excess oxalyl chloride was removed and the residue was redissolved in DCM and evaporated to dryness to remove the oxalyl chloride and obtain an oily residue of oleoyl chloride.

Oleoyl chloride obtained above was redissolved in 50 mL DCM and precooled in an ice bath. Hexaethyleneglycol (4.99 g, 17.7 mmol) and TEA were added to the reaction mixture and the pH was adjusted to 9. The reaction mixture was stirred overnight. The product tested by ESI/MS showing the $PEG_6$-oleoyl to be dominant with an additional bis $PEG_6$-oleoyl. The reaction mixture was evaporated under reduced pressure and the resulting residue was redissolved in DCM and extracted with water. The DCM phase was evaporated to dryness, redissolved in ethanol and purified using a Reveleris® C18 40 g in a preparative HPLC. The mobile phase (A) 90:10 H2O/ethanol and (B) 100% ethanol. The pure fractions were collected and evaporated to dryness to give 2.9 g of an oil (yield: 60%). ESI-MS (MeOH)+ve mode m/z: 547 [M+H].

Example 6.2: Oleoyl-$PEG_6$-chloroformate $PEG_6$-oleoyl (2.9 g, 5.32 mmol) and triphosgene (0.53 g, 1.77 mmol) were dissolved in 30 mL of dichloromethane, stirred and cooled on an ice bath. Anhydrous pyridine (0.43 mL, 5.32 mmol) was added dropwise to the reaction mixture and the reaction mixture was stirred for 30 min in ice bath, followed for 2 h at room temperature. The reaction mixture quickly extracted with extra methylene chloride and ice water. The organic layer was pooled, dried over Na2SO4 and evaporated to dryness and used for the next stage reaction with protected Gemcitabine.

Example 7: Synthesis of 2'-deoxy-2',2'-difluoro-N4-(((cis-9, 12, 15 octadecatrienoyl)-oxy-hexaethyleneglycol)oxy)carbonyl) cytidine (Gem-$PEG_6$-Linolenoyl)

Gemcitabine base (0.42 g, 1.6 mmol) was dissolved in 5 mL DMF. Anhydrous pyridine (0.64 mL, 8 mmol) was added to the solution and stirred using a magnetic stirrer over an ice bath. Chlorotrimethylsilane (0.91 mL, 8 mmol) was added to the solution dropwise and the reaction mixture was stirred for one hour. The product showed a positive ion m/Z of 408. Chloroformate solution of $PEG_6$-oleate (0.97 g, 1.6 mmol) was dissolved in DMF (6 mL) and added to the reaction mixture dropwise. The reaction was left to stir at room temperature for two hours. The protecting silyl ether was removed at the conclusion of the reaction by the addition of deionized water (12 mL) followed by stirring for one hour. The reaction mixture was evaporated under reduced pressure and the resulting residue was taken up in diethyl ether and a small amount of water before being separated in an extraction funnel. The organic phase was collected and dried over Na2SO4 followed by evaporation under reduced pressure, resulting in the crude product. The crude product was purified using a Releveris® C18 40 g in a preparative HPLC. The mobile phase (A) 90:10 H2O/ethanol and (B) 100% ethanol. The pure fractions were collected and evaporated to dryness to give 0.58 g of a yellow wax (yield: 50%). ESI-1H NMR (400 MHz, DMSO-d6): δ 10.83 (s, 1H, —NHCO); 8.21 (d, 1H, 6-CH); 7.09 (d, 1H, 5-CH); 6.3 (d, 1H, 1'-CH), 6.16 (t, 1H, 5'-OH); 5.35-5.28 (m, 7H, CH═CH, 3'-OH); 4.25 (m, 2H, CH2-OCO), 4.18 (m, 4'-CH); 4.09 (t, 2H, CO2-CH2); 3.79-3.67 (dd, 1H, 5'-CH2); 3.67-3.45 (m, 20H, CH2-0), 2.7 (m, 1H, CH), 2.33 (t, 2H, CH2), 1.97 (m, 4H, —CH2-); 1.48 (m, 2H, —CH2); 1.36-1.15 (m, 22H—CH2-); 0.84 (t, 3H, —CH3), MS (MeOH)+ve mode m/z: [M+H]: 832.20, [M+Na]: 854.33.

Synthesis of Intermediate Compounds

Example 7.1: Linolenoyl-PEG$_6$

Linolenic acid (1 g, 3.5 mmol), was dissolved in 10 mL DCM and cooled down in an ice bath. Oxalyl chloride (0.9 g, 7 mmol) was added dropwise to the reaction mixture. The reaction mixture was stirred for further 10 min in an ice bath and returned to room temperature and stirred for additional 2 h. The excess oxalyl chloride was removed and the residue was redissolved in DCM and evaporated to dryness to remove the oxalyl chloride and obtain an oily residue of linolenoyl chloride.

Linolenoyl chloride obtained above was redissolved in 20 mL DCM and precooled in an ice bath. Hexaethyleneglycol (0.56 g, 7 mmol) and TEA were added to the reaction mixture and the pH was adjusted to 9. The reaction mixture was stirred overnight. The product tested by ESI/MS showing the PEG$_6$-linolenoyl to be dominant with an additional bis PEG$_6$-oleoyl. The reaction mixture was evaporated under reduced pressure and the resulting residue was redissolved in DCM and extracted with water. The DCM phase was evaporated to dryness, redissolved in ethanol and purified using a Releveris® C18 40 g in a preparative HPLC. The mobile phase (A) 90:10 H$_2$O/ethanol and (B) 100% ethanol. The pure fractions were collected and evaporated to dryness to give 0.95 g of an oil (yield: 50%). 1H NMR (400 MHz, DMSO-d6): δ 10.83 (s, 1H, —NHCO); 8.21 (d, 1H, 6-CH); 7.09 (d, 1H, 5-CH); 6.3 (d, 1H, 1'-CH), 6.16 (t, 1H, 5'-OH); 5.5 (b, 3'-OH), 5.35-5.28 (m, 6H, CH═CH); 4.25 (m, 2H, CH2-OCO), 4.18 (m, 4'-CH); 4.09 (t, 2H, CO2-CH2); 3.79-3.67 (dd, 1H, 5'-CH2); 3.67-3.45 (m, 20H, CH2-0), 2.33 (t, 2H, CH2), 1.97 (m, 4H, —CH2-); 1.48 (m, 2H, —CH2); 1.36-1.15 (m, 8H—CH2-); 0.84 (t, 3H, —CH3). ESI-MS (MeOH)+ve mode m/z: 545.13 [M+H].

Example 7.2: Linolenoyl-PEG$_6$-chloroformate

PEG$_6$-linolenoyl (0.59 g, 1.75 mmol) and triphosgene (0.166 g, 0.58 mmol) were dissolved in 10 mL of dichloromethane, stirred and cooled on an ice bath. Anhydrous pyridine (0.15 mL, 1.75 mmol) was added dropwise to the reaction mixture and the reaction mixture was stirred for 30 min in ice bath, followed for 2 h at room temperature. The reaction mixture quickly extracted with extra methylene chloride and ice water. The organic layer was pooled, dried over Na2SO4 and evaporated to dryness and used for the next stage reaction with protected Gemcitabine.

Example 8: Synthesis of 2'-deoxy-2',2'-difluoro-N4-((((cis-9, octadecenoyl)amino-triethyleneglycol)oxy) carbonyl) cytidine (Gem-PEG$_3$-Oleoylamide)

Gemcitabine base (1.052 g, 4 mmol) was dissolved in DMF (3 mL), and added to a round bottom flask and sealed under nitrogen. Anhydrous pyridine (1.62 mL, 20 mmol) was added to the solution and stirred using a magnetic stirrer over an ice bath. Chlorotrimethylsilane (2.172 mL, 20 mmol) was added to the solution dropwise and the reaction was stirred for 1 h. The product showed a positive ion m/Z of 408. N-Boc (Peg3)-chloroformate (4 mmol), a product obtained from reaction described in 8.1, was added to the Gemcitabine solution. Anhydrous pyridine (1.62 mL) was added and the reaction mixture was left to stir at room temperature for 1 h. The product showed a positive ion m/Z of 682.7. Pyridine salt was removed by filtration and the filtrate was evaporated to dryness. The residue was redissolved in DCM (5 mL) and cooled to 4° C. Trifluoroacetic acid (TFA, 5 mL) was added to the DCM solution and stirred for 30 min at 4° C. and 1 h at room temperature. The product showed a positive ion (m/Z of 438.93). TFA and DCM were then evaporated under reduced pressure. The residue was redissolved in water and purified on preparative HPLC using a Releveris® C18 40 g. Water and water/ethanol (50/50) were used as solvent A and B, and using a linear gradient program from 100% solvent A to 100% solvent B. The right fractions were pooled and evaporated to dryness. To this product (0.876 g, 2 mmol), was added oleoyl succinimide, which was obtained from example 8.2. The pH of the reaction was adjusted to 7.5-8 by addition of triethylamine (0.7 mL). The title compound was formed after 30 min reaction as confirmed by MS, showing the right MS+ve mode m/z: 703.14. The solvent was evaporated to dryness and the residue was redissolved in Ethanol/Water and purified on a preparative HPLC using a Releveris® C18 40 g. Water/Ethanol (90/10) and ethanol were used as solvent A and B, and using a linear gradient program from 100% solvent A to 100% solvent B. The right fractions were pooled to obtain 450 mg of the pure compound with the total yield of 36%. ESI-MS (MeOH)+ve mode m/z: 703.14, 725.27, 1427.10.

Synthesis of Intermediate Compound

Example 8.1 N-Boc-PEG$_3$-chloroformate

N-Boc-PEG$_3$-OH (0.997 g, 4 mmol) was dissolved in 4 mL DCM and added to a round bottom flask and sealed under nitrogen. Triphosgene (0.395 g, 1.33 mmol), dissolved in 3 mL DCM was added to the reaction mixture at 4° C., followed by dropwise addition of Pyridine (0.33 mL). The mixture was stirred for 30 min at 4° C. and 2 h at room temperature. The product solution was further added to the protected Gemcitabine solution (example 8) without any further purification.

Example 8.2 Oleoyl Succinimide

Oleic acid (0.564 g, 2 mmol) was dissolved in 2 mL DCM and mixed with N-Hydroxysuccinimide (HOSU, 0.276 g, 2.4 mmol). The mixture was sealed under nitrogen and stirred at 4° C. N, N'-dicyclohexyl carbodiimide (DCC, 0.453 g, 2.2 mmol), dissolved in 4 mL DCM was added dropwise to the reaction mixture and stirred for 30 min at 4° C., and 3h at room temperature. The white DCU precipitate was filtered and the filtrate was used for the next step reaction without purification, noted in example 8.

Example 9: DSC of Gem-Amphiphiles

Figure 2:
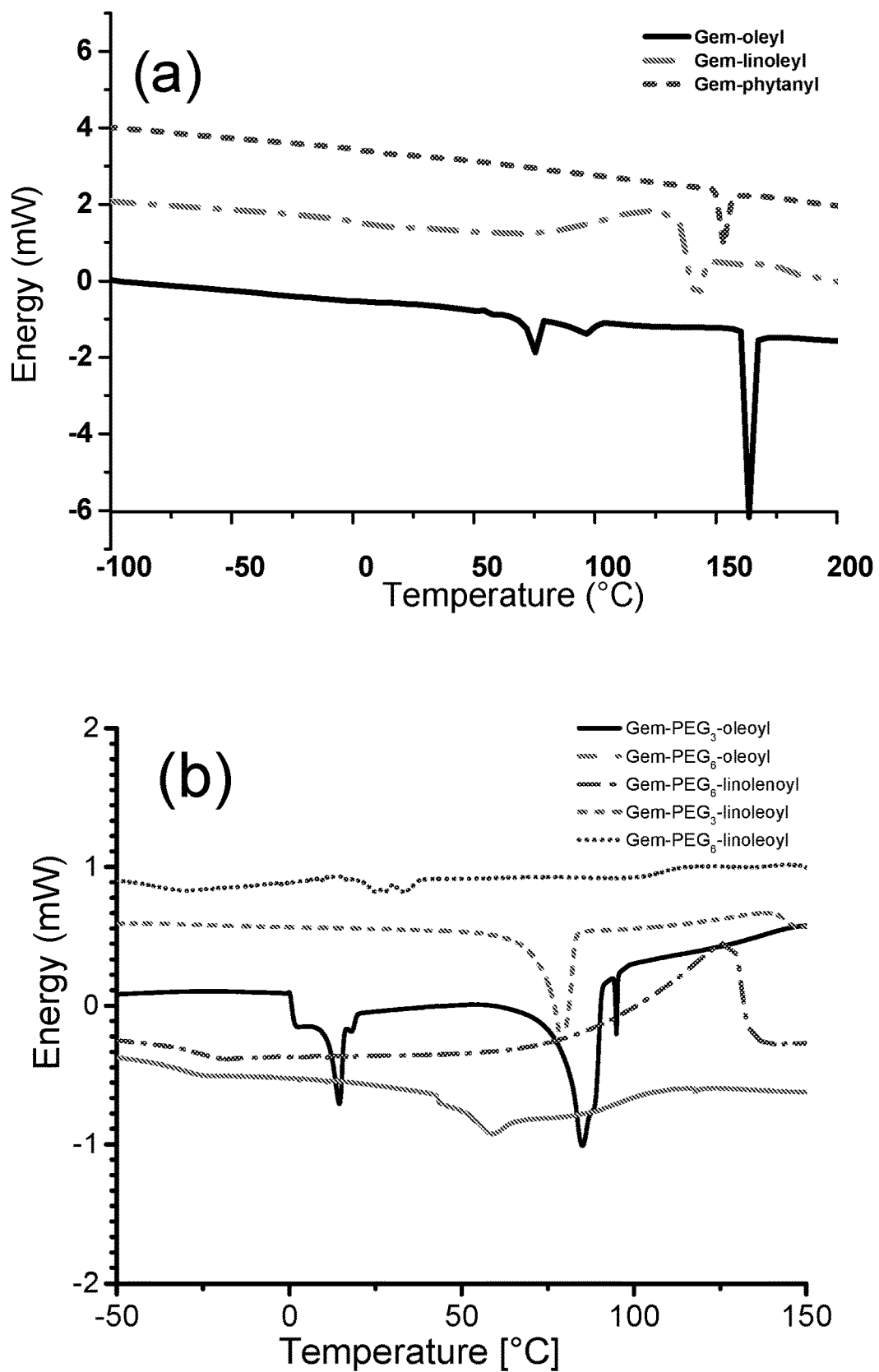
FIG. 2: DSC of representative Gemcitabine amphiphiles: (a) without spacers, (b) with PEG spacers.
Figure 3:
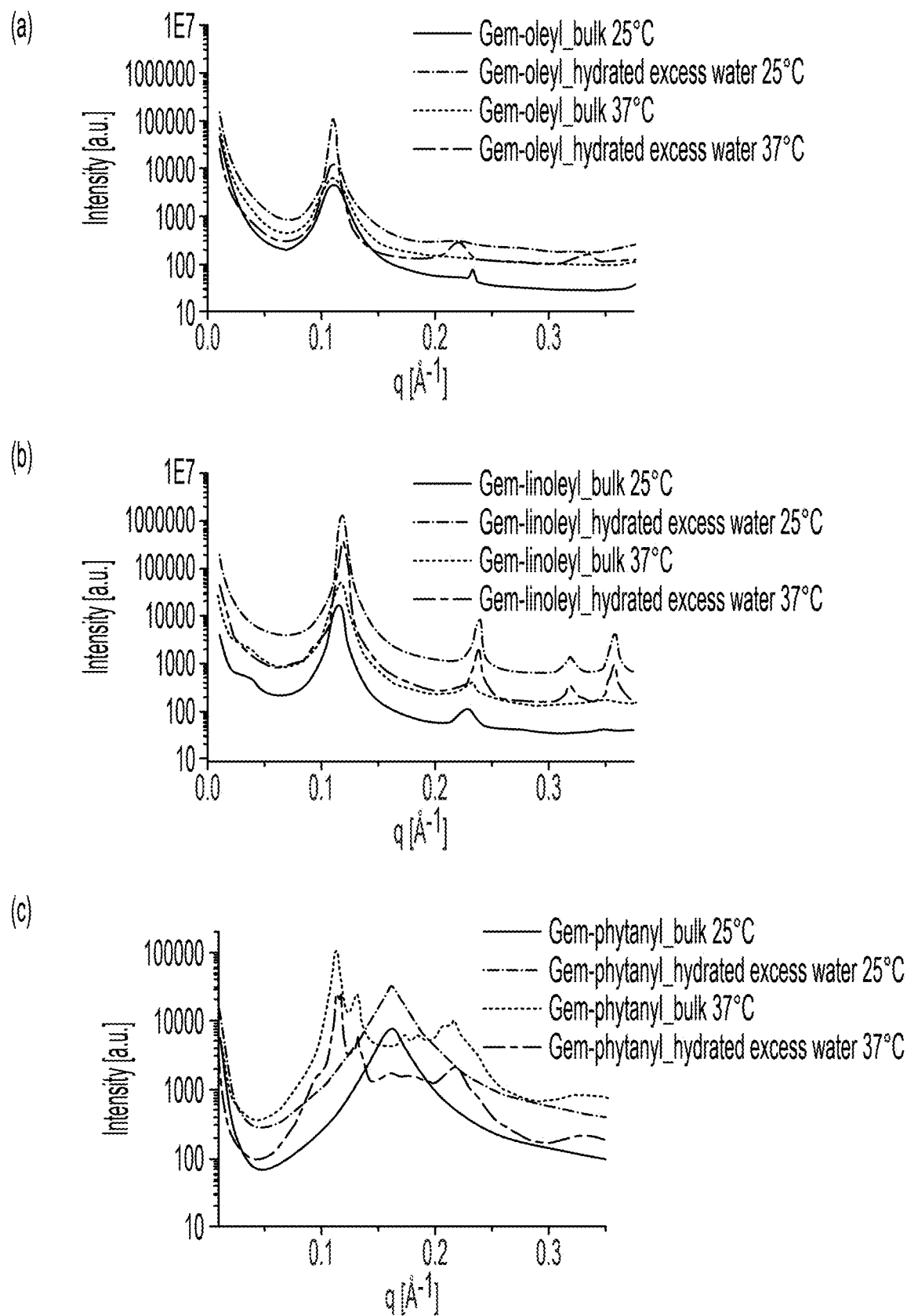
FIG. 3: 1D SAXS diffraction patterns of neat and lyotropic mesophase behaviour of representative Gemcitabine amphiphiles without spacers: (a) Gem-oleyl, (b) Gem-linoleyl, (c) Gem-phytanyl; — Bulk_25° C., . . . hydrated Excess water_25° C., x x x, hydrated Excess water_37° C.
Figure 4:
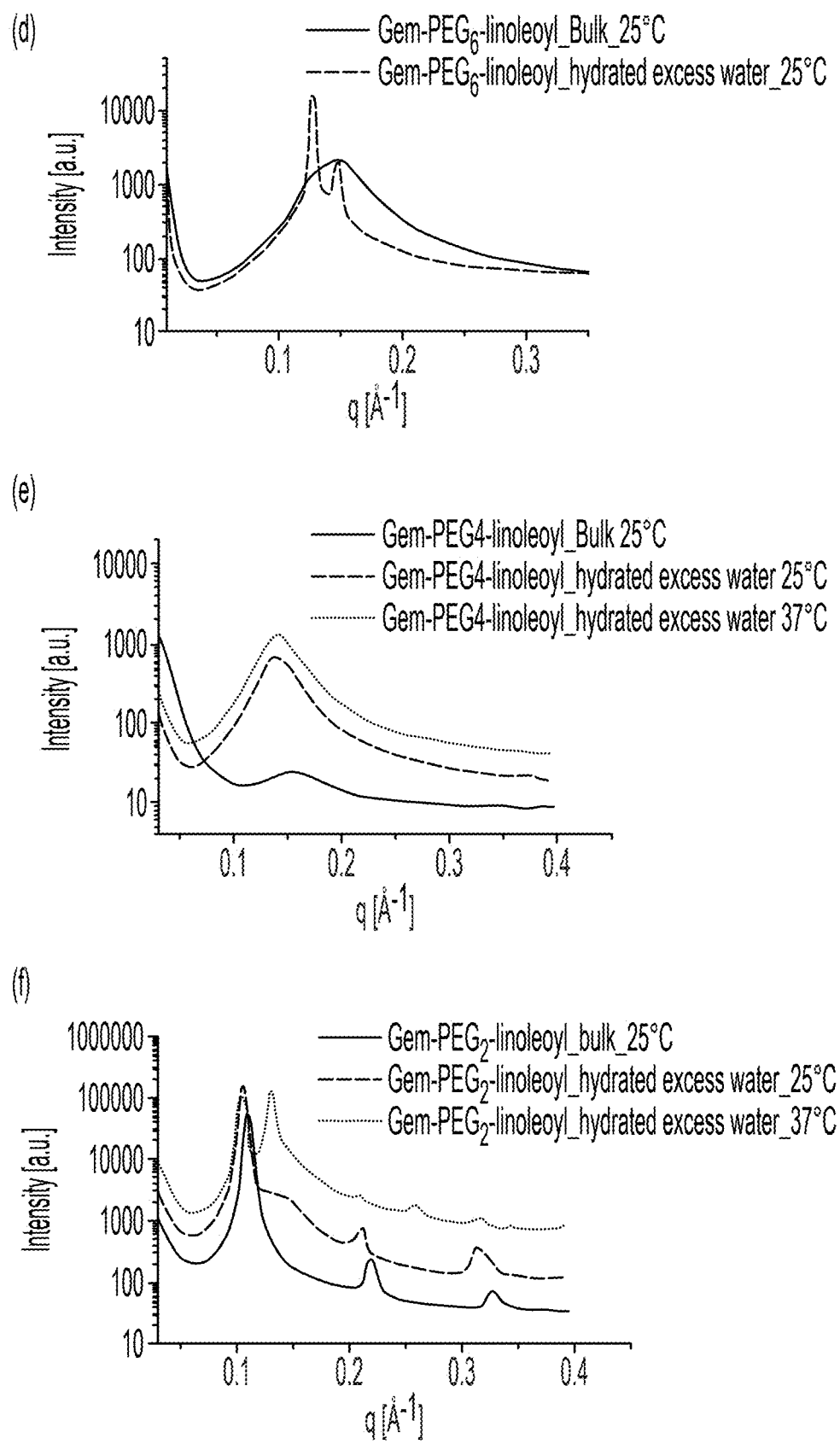
FIG. 4: 1D SAXS diffraction patterns of neat and lyotropic mesophase behaviour of representative Gemcitabine amphiphiles with PEG spacers: (a) Gem-PEG$_6$-oleoyl, (b) Gem-PEG$_6$-linolenoyl, (c) Gem-PEG$_3$-linoleoyl, (d) Gem-PEG$_6$-linoleoyl, (e) Gem-PEG$_4$-linoleoyl, (f) Gem-PEG$_2$-linoleoyl; — Bulk_25° C., . . . hydrated Excess water_25° C., x x x hydrated Excess water_37° C.

DSC was used to measure the temperatures associated with phase transitions of the different gemcitabine prodrug amphiphiles (FIG. 2A). The DSC thermogram of gem-ole displays an endothermic transition at 59.97° C. and 76.31° C. which may be attributed to the changing of the crystal structure. An endothermic peak at 98° C. corresponded with the melting point of the prodrug and this was confirmed with visual observation under an optical microscope. The large endothermic peak at 167.72° C. may be attributed to degradation of the sample as this peak was not observed in subsequent heat and cooling sample (data not shown). A glass transition was observed in gem-lin at 4.81° C. An exothermic peak occurred at higher temperatures with an onset −74° C. This is likely the attribute of oxidation of the unsaturated linoleoyl chains. A second endothermic peak at ~137.82° C. was not observed in subsequent heating and cooling cycles and may be attributed to degradation of the sample. In the DSC of gem-phy, two glass transitions were observed at 2.92 and 79.31° C. A large endothermic peak was observed at 152.64° C. which is indicative of degradation of the sample.

The DSC of the Gem amphiphiles with PEG spacers are shown in FIG. 2B. The Gem amphiphiles with $PEG_3$ spacer, either with a oleoyl or linoleoyl chains showed a large endothermic peak at 85.6 and 79.1° C. Addition of the PEG length to six decreased the melting point of the sample to 59.7, whereas the linoleoyl counterpart melting point decreased to 34.26 with a much smaller melting enthalpy. The linolenoyl counterpart was an oil sample and did not show any melting point.

Demonstration of Self-Assembly Behaviour

Example 10: Analysis of Gem Amphiphile Mesophase Behaviour Using Polarized Optical Microscope (POM) and Small Angle X-Ray Scattering (SAXS)

The results of the water penetration scans and SAXS are summarised in Tables 1 and 2 and indicate that various self-assembled lyotropic liquid crystalline phases were formed for the different Gem apmphiphiles, with a broad range of mesophases from lamellar crystalline structure to lamellar liquid crystalline, cubic mesophases and sponge mesophases.

The textures obtained from water penetration scans along the established concentration gradient from neat amphiphile to pure water provide a quick insight into the lyotropic phase behaviour of a surfactant/water system. Melted neat amphiphile was placed on a microscopic slide and water was then introduced around the edge. GemPhy has the ability to form 3D inversed bicontinous cubic phase (Pn3m space group) initially and then transform to 2D hexagonal phase with elevated temperature or with prolonged equilibration time. Likewise, prodrug GemOle was able to form traditional lamellar (Lα) phase at room temperature and 3D cubic (Pn3m) phase at elevated temperatures above 33° C.

TABLE 1

Mesophases observed by POM at excess water for various Gem amphiphiles are summarised below.

| Composition | Equilibration Conditions | Neat amphiphile at 25° C. | Appearance of the Lyotropic phase at excess water (25° C.-50° C.) |
|---|---|---|---|
| Gem-Ole | 1 h | White crystal | Anisotropic band |
| Gem-Lin | 1 h | Waxy crystal | A birefringent band (LC) |
| Gem-Phy | 1 h | Waxy crystal | An isotropic band |
| Gem-PEG3-oleoyl | 1 h | White crystal | Birefringent ( lamellar) |
| Gem-PEG6-oleoyl | 1 h | Waxy light yellow liquid | An isotropic band, cubic phase |
| Gem-PEG3-linoleoyl | 1 h | Light yellow crystal | An isotropic band, emulsion |
| Gem-PEG6-linoleoyl | 1 h | Waxy liquid | An isotropic band, cubic phase |
| Gem-PEG6-linolenoyl | 1 h | Waxy yellow solid | Emulsion |

TABLE 2

Phase behaviour of various Gem amphiphiles, at various temperatures. LC (Lamellar crystalline), Lα: liquid crystalline lamellar, Ia3d: Gyroid inverse cubic.

| Composition | Equilibration Conditions | Measured Temperature | Neat amphiphile (Lattice parameter: (Å)) | Lyotropic phase (Lattice parameter: (Å)) |
|---|---|---|---|---|
| Gem-Ole | 48 h | 25° C. | LC (55.2 ± 0.5, 35.3 ± 0.5) | LC: (57.1 ± 0.5, 35.3 ± 0.5) |
|  |  | 37° C. | LC(55.2 ± 0.5, 27.0 ± 0.5) | LC:(55.2 ± 0.5,27.0 ± 0.5) |
| Gem-Lin | 48 h | 25° C. | LC (55.2 ± 0.5) | LC(53.2 ± 0.5) |
|  |  | 37° C. | LC(55.2 ± 0.5) | LC(53.2 ± 0.5) |
| Gem-Phy | 48 h | 25° C. | Molten phase(39.0 ± 0.5) | Ia3d (135.8 ± 0.5) |
|  |  | 37° C. | Molten phase (39.0 ± 0.5) | Ia3d (135.8 ± 0.5) |
| Gem-PEG3-oleoyl | 48 h | 25° C. | LC (55.26 ± 0.5) | LC (55.26 ± 0.5) |
|  |  | 37° C. | LC (55.26 ± 0.5) | LC (55.26 ± 0.5) |
|  |  | 45° C. | LC (48..89 ± 0.5) | LC (48..89 ± 0.5) |
| Gem-PEG6-oleoyl | 48 h | 25° C. | LC (45.53 ± 0.5) + a broad molten peak | Ia3d (125.2 ± 0.5) |
|  |  | 37° C. | LC (55.26 ± 0.5) + a broad molten peak | Ia3d (124.4 ± 0.5) |

TABLE 2-continued

Phase behaviour of various Gem amphiphiles, at various temperatures. LC (Lamellar crystalline), Lα: liquid crystalline lamellar, Ia3d: Gyroid inverse cubic.

| Composition | Equilibration Conditions | Measured Temperature | Neat amphiphile (Lattice parameter: (Å)) | Lyotropic phase (Lattice parameter: (Å)) |
|---|---|---|---|---|
| Gem-PEG3-linoleoyl | 48 h | 25° C. | LC (55.60 ± 0.5) | Sponge phase (L3) |
|  |  | 37° C. | — | Sponge phase (L3) |
| Gem-PEG6-linoleoyl | 48 h | 25° C. | Molten phase | Ia3d (125.2 ± 0.5) |
| Gem-PEG6-linolenoyl | 48 h | 25° C. | Molten phase | Sponge phase (L3) |

LC: Lamellar crystalline.

Example 11: Preparation of Colloidal Particles or Dispersions

The preferred prodrugs according to the current invention can be dispersed in aqueous solution and form colloidal particles with very fine internal nanostructures in the size range of 100-1000 nm, by using the following procedure.

Typical nanoparticle dispersions were prepared from Gem amphiphiles in the presence or absence of phospholipid, optionally including cholesterol, wherein the phospholipid is selected from: Dioleoylphosphatidylcholine (DOPC), Dimyristoylphosphatidylcholine (DMPC), and combinations thereof. A representative method is outlined below:

The Gem amphiphiles were hydrated with warm PBS containing 15-30% PEG4K-oleoyl and sonicated in a sonicator bath and using a probe sonicator resulting in the lipid emulsion. The Gem amphiphile nanoparticles were then processed through a polycarbonate membrane (3×200 nm, 3×100 nm) using an extruder (Avestin, LipoFast LF-50) in order to ensure homogenous sizing. Gemcitabine amphiphile-nanoparticles including phospholipids were prepared by mixing either (i) DOPC and gem-oleyl, (ii) DMPC/cholesterol and gem-phytanyl, or (iii) DMPC/cholesterol and Gem-PEG$_3$-oleoyl in ethanol followed by vigorous mixing and gentle evaporation under reduced pressure resulting in a thin film. The thin film was then hydrated with warm PBS containing 10-15% of PEG4K-oleoyl solution, sonicated in a sonicator bath and using a probe sonicator resulting in the lipid emulsion. The nanoparticles were then processed through a polycarbonate membrane (3×200 nm, 3×100 nm) using an extruder (Avestin, LipoFast LF-50) in order to ensure homogenous sizing.

Dispersions used for in vitro or in vivo studies were sterile filtered using a 220 μM filter. The final concentration of the nanoparticle solutions was 10 mg/mL. The particle size distribution and morphology of the above suspensions were determined using the method as described above by using zetasizer and cryo-TEM characterisation methods.

Solid lipid particles: Solid lipid particles of Gem amphiphiles were prepared using mechanical methods according to the above method.

Figure 5:
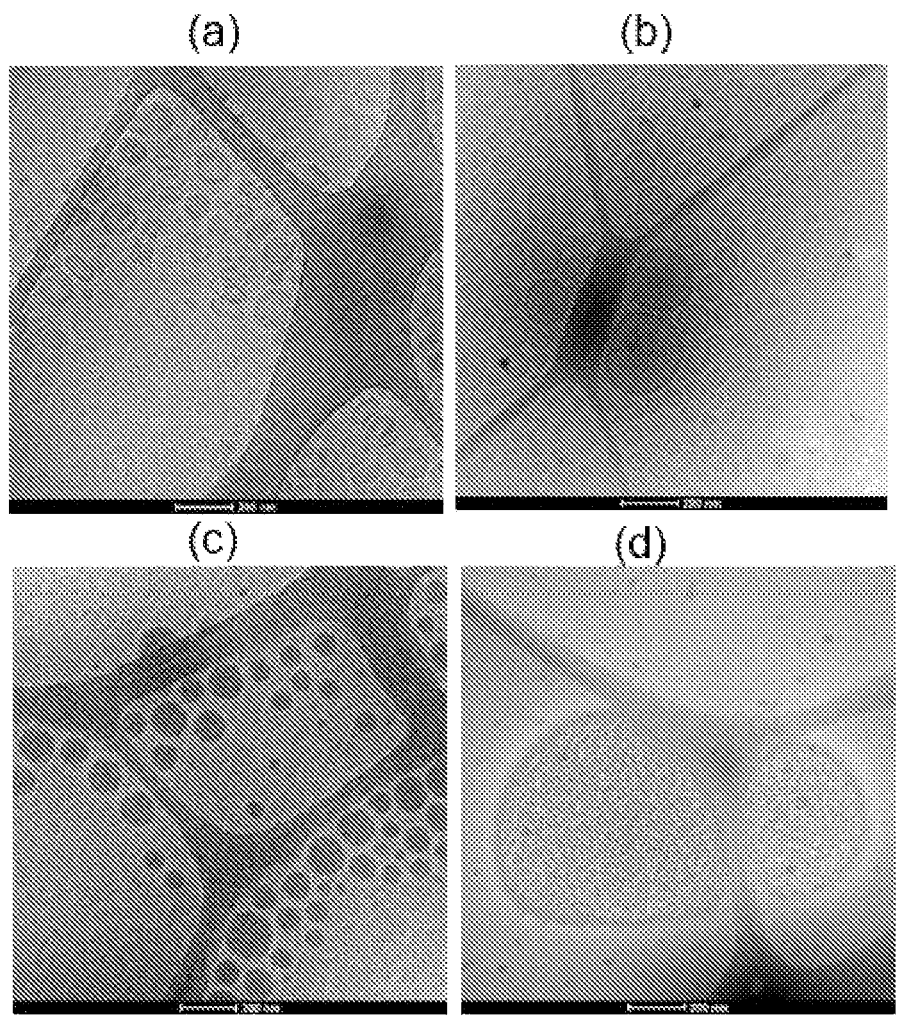
FIG. 5: Cryo-TEM images of Gemcitabine amphiphile nanoparticles in the presence or absence of phospholipids/cholesterol: (a) Gem-phytanyl/DMPC/cholesterol (18.38/70.52/8.10 w %), (b) Gem-PEG$_3$-oleoyl/DMPC/cholesterol (31.04/62.07/6.89 w %), (c) Gem-PEG$_3$-linoleoyl and (d) Gem-PEG$_6$-linoleoyl.

Example 12: Morphology and Size Distribution 12.1 Cryo-TEM Cryo-TEM images of Gem-amphiphile nanoparticles optionally including phospholipids and cholesterol were obtained using a laboratory-built vitrification system allowing humidity to be kept close to 90% during sample plunging and vitrification. 4-5 μl of sample solution was applied to a 300 mesh copper TEM grid coated with a lacey carbon film (ProSciTech, Thuringowa Old 4817Australia) and allowed to settle for 30s. The grid was manually blotted for 10-15s, and the resulting thin film was then vitrified by plunging into liquid ethane. Grids were stored in liquid nitrogen before transferring into a Gatan 626-DH Cryo-holder. Imaging was carried out using an FEI Tecnai 12 TEM, operating at 120 kV, equipped with a MegaView III CCD camera and AnalySis imaging software (Olympus Soft Imaging Solutions). The sample was kept at a temperature of −180° C. and standard low-dose procedures were used to minimize radiation damage. Representative cryo-TEM of nanoparticles of DMPC/Gem-phytanyl/cholesterol stabilised with PEG$_4$K-oleoyl, and DMPC/Gem-PEG$_3$-oleoyl/cholesterol, stabilised with PEG$_4$K-oleoyl are shown in FIGS. 5 (a) and 5 (b), respectively. Nanoparticles made from Gem-PEG$_3$-linoleoyl and Gem-PEG$_6$-linoleoyl are shown in FIGS. 5(c) and 5(d), respectively.

12.2 Dispersions Characterization: Particle Size Distribution:

Determination of the particle size distribution of the nanoparticle dispersions (colloidodomes) were carried out using a Zetasizer (nano zs, Malvern, England) equipped with a He—Ne Laser (4 mw, 633 nm) and an avalanche photodiode detector. Dynamic light scattering (DLS) analysis was performed on the dispersion in a disposable sizing cuvette with the scattering angle of θ=90° at 25° C. Each measurement was repeated at least three times. The viscosity and RI value of 0.8872 cp and 1.330 were used respectively in the data calculation. The size distribution was recorded by intensity.

Figure 6:
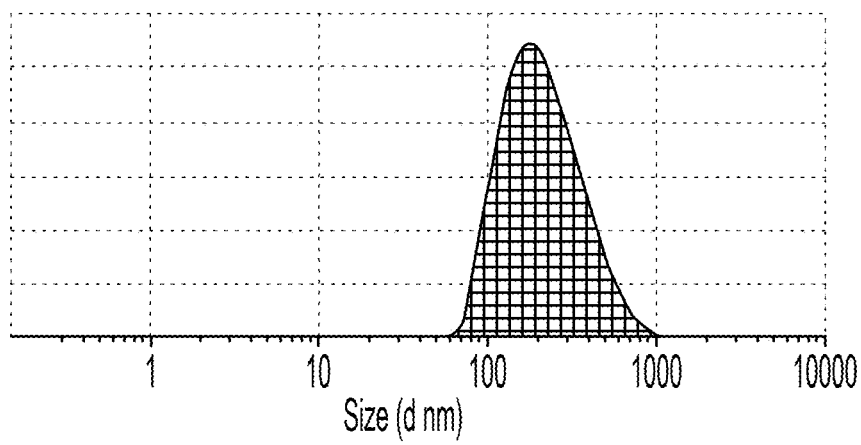
FIG. 6: Particle size distribution of Gemcitabine amphiphile nanoparticles in the presence and absence of phospholipids/cholesterol determined by dynamic light scattering (DLS): (a) Gem-phytanyl/DMPC/cholesterol (18.38/70.52/8.10 w %), (b) Gem-PEG$_3$-oleoyl/DMPC/cholesterol (31.04/62.07/6.89 w %), (c) Gem-PEG$_3$-linoleoyl and (d) Gem-PEG$_6$-linoleoyl.
Figure 6:
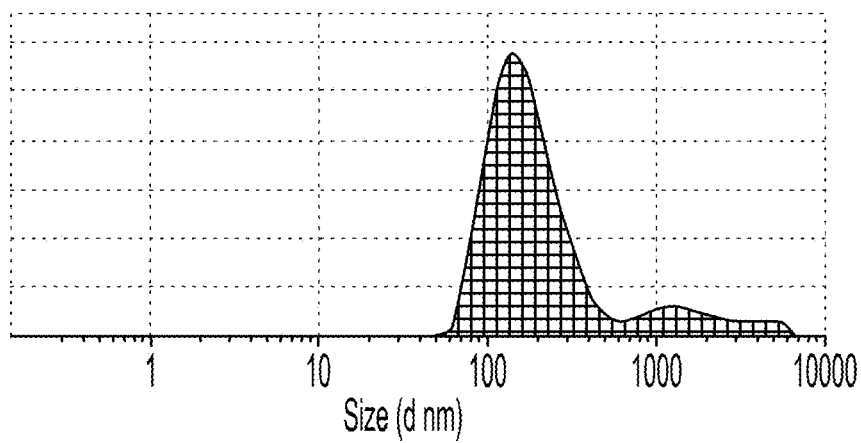

Representative nanoparticle dispersions manufactured from various Gem amphiphiles are shown in FIG. 6.

Example 13: In Vitro Results

The cytotoxicity of gemcitabine nanoparticles dispersion made from gemcitabine amphiphiles in the presence or absence of DMPC-cholesterol was evaluated in comparison to gemcitabine alone in several pancreatic cell lines including CF Pac-1, BxPC3, Panc-1 and MIA PaCa-2, MCF7and CACO2 cell lines. The cell lines were exposed to media with varying concentrations of the treatments (100-0.001 μM) and incubated for 72 hours. Cell viability was determined using the MTS assay and was conducted in triplicate to derive the IC50 values.

The treatments resulted in a dose dependent decrease in cell viability in all cell lines. The experimental results indicated that gemcitabine alone had an IC50 value of 6 nM to >100 in PANC1 cell lines. IC50 of gemcitabine against the CFPAC-1 cell line at 72 hours as ranging from 6.1-33 nM. All Gemcitabine amphiphile nanoparticles had less toxicity to the cells. Without wishing to be bound by theory, the inventors postulate that the reason for this phenomenon may be due to a longer window of time required for gemcitabine nanoparticles to transform to the active, cytotoxic, free gemcitabine and further phosphorylation reactions to mono, di and triphosphate. On the other hand, free gemcitabine enters via transport proteins and is different from the mechanism of nanoparticle uptake by endocytosis. The gemcitabine prodrug is also required to bioconvert into gemcitabine in order to exert its cytotoxic effect as opposed to gemcitabine which is already in an active state.

TABLE 3

$IC_{50}$ values of gemcitabine drug in comparison to Gem-amphiphile phospholipid nanoparticles and Gem-PEG-amphiphile nanoparticles against the CFPAC-1, BxPC3, MIAPaCa-2 and PANC-1, MCF7 and CACO2 cell lines for 72 hours. The results show that gemcitabine had greater cytotoxicity than the gem-amphiphile nanoparticles in the presence or absence of phospholipid.

| Cell line | Gemcitabine (µM) | Gem-Phytanyl-DMPC/cholesterol (µM) | Gem-PEG$_3$-linoleoyl (µM) |
|---|---|---|---|
| CFPAC-1 | 0.065 | 0.334 | 0.583 |
| BxPC3 | 0.0225 | — | — |
| MIAPaCa-2 | 0.023 | — | — |
| PANC-1 | >100 | — | — |
| MCF7 | 0.006 | 0.05 | 0.1 |
| CACO2 | 0.05 | 0.2 | 0.2 |

Example 14: In-Situ Enzymatic Reaction 14.1: Preparation of Nanoparticles for Kinetics Study Nanoparticle dispersions of a mixture of Dimyristoylphosphatidylcholine and cholesterol with either (i) Gemcitabine-Phytanyl, (ii) Gemcitabine-PEG$_3$-oleoyl or (iii) Gemcitabine-PEG$_3$-oleoylamide were made at 50 µm concentration of Gemcitabine prodrugs. Carboxylesterase solution from porcine liver obtained from Sigma-Aldrich was added to the nanoparticle dispersions, and the enzyme concentration in each respective nanoparticle dispersion was set to 33.7 units/mL.

14.2: Enzymatic Bioconversion

The time at which the enzyme solution was added was taken as time zero for the hydrolysis reaction. The mixture was maintained at 37° C. throughout the experiment. The concentration of the hydrolysis product was measured at various time intervals using LC/MS and LC/MS$^2$ for the detection of prodrug converted to the active drug Gemcitabine. The time at which the sample was injected into the LC column was taken to be the reaction time for such sample. The hydrolysis progress curve, showing the decrease in the concentration of original substrate was plotted against time, whereas the bioconversion to Gemcitabine was determined by MS$^2$ methods. Standard curves for both prodrugs and the active bioconverted gemcitabine was assessed by using standard samples.

Thermo Finnigan (Finnigan LCQ Series, Thermo Scientific, USA) LC/MS equipped with an electron spray ionization (ESI) was used to assess the enzymatic reaction using both MS and MS$^2$ mode. The prodrug depletion was detected by negative ion for MS. The conversion of the prodrug to the Gemcitabine was detected by MS$^2$ at 112.1. 10 µl of sample withdrawn from the reaction solution was injected directly into a Phenomenex C8 150 mm×2 mm 5 uLuna column (Phenomenex, Australia). A 100% Methanol solution was used as mobile phase with the flow rate of 0.5 ml/min. The sample after the column separation was eluted to ESI source. The capillary temperature and ion spray voltage were set at 350° C. and 4.60 respectively. The sample temperature was well maintained at 37° C. during the entire measurement by incubating the samples in the temperature controlled auto-sampler. Data were acquired and processed with Xcalibur Quan chromatography software.

The synthesized prodrugs had a retention time of 5.26, 4.80, and 4.75 with m/z of 585.97, 702.07, and 701.05 corresponding to Gem-Phytanyl, Gem-PEG$_3$-Oleoyl, and Gem-PEG$_3$-Oleoylamide respectively.

The decreased prodrug was calculated as the percentage of the area under the peak of Gemcitabine-prodrug compared to that before addition of the enzyme. The amount of Gemcitabine produced, was calculated from the area under the peak at 3.4 min related to Gemcitabine at 263 and its MS$^2$ at 112.1.

Figure 7:
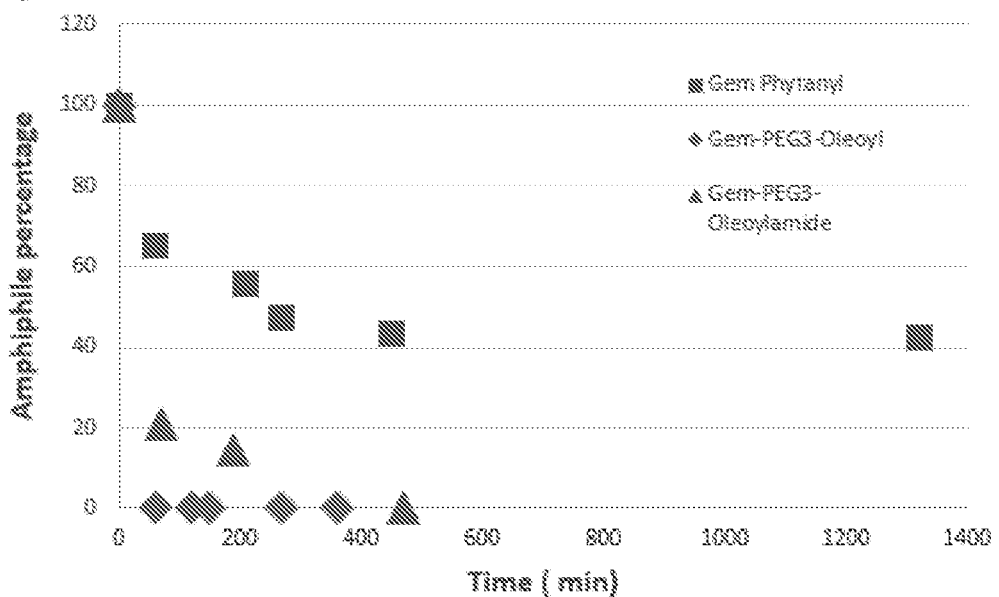
FIG. 7: Bioconversion of Gemcitabine amphiphile nanoparticles comprising phospholipid/cholesterol and 50 uM of: Gem-phytanyl (■), Gem-PEG$_3$-Oleoyl (♦), or Gem-PEG$_3$-oleoylamide (▲) using CES Enzyme (33.7 units/mL) at 37° C.
Figure 7:
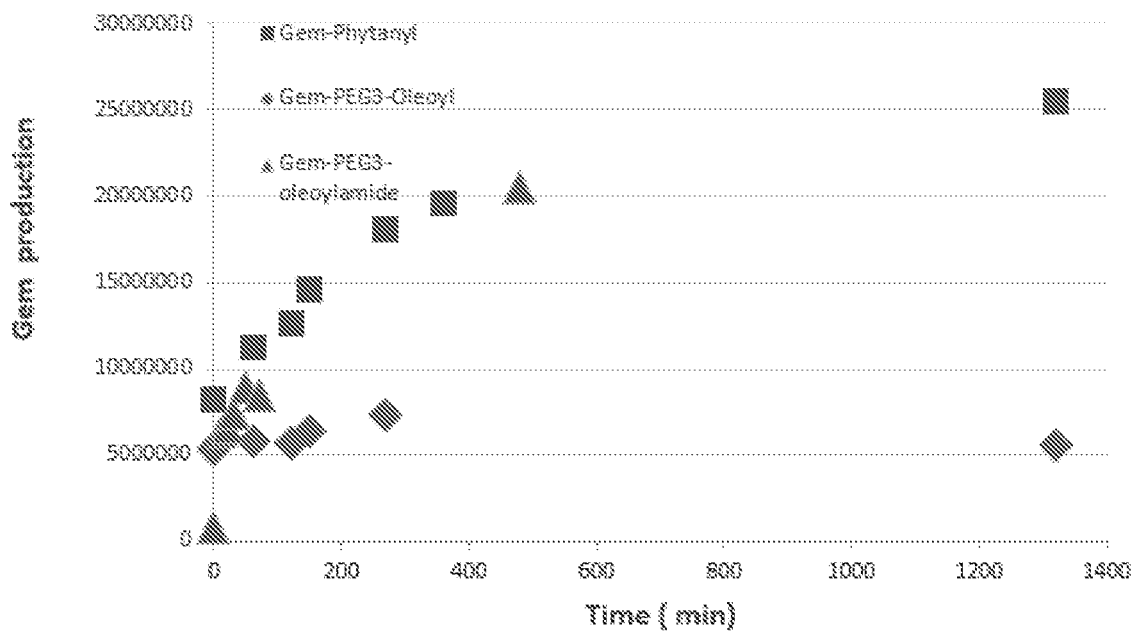

The enzyme hydrolysis reaction at comparable enzyme concentration (33.7 units/mL) was plotted as the ratio of prodrug at a certain incubation time to that of the original prodrug concentration (FIG. 7a). FIG. 7b shows the amount of gem produced at comparative time intervals.

Gem-PEG$_3$-oleoyl with an ester bond between the hydrophobic chain and PEG$_3$ reduced to Gem-PEG$_3$ and the oleic acid quickly, but bioconverted Gemcitabine very slowly. Gem-PEG$_3$-oleoylamide was reduced at a lower rate –6 h (FIG. 7a) but produced Gemcitabine sustainably. Gem-Phytanyl was the slowest prodrug to reduce completely, but produced Gemcitabine at similar level to Gem-PEG$_3$-Oleoylamide.

Example 15: In Vivo Tumour Inhibition

The anti-tumour efficacy of Gem-phytanyl-DMPC-Cholesterol nanoparticles was assessed in comparison to free gemcitabine in a CFPAC-1 cell line-derived xenograft animal model over 34 days. All treatments were administered via IV injection twice a week for four weeks. The amount of gemcitabine administered in the Gem nanoparticles was 4.45 mg/kg, which is an order of magnitude less than the ordinary dose used in clinic. The doses were equimolar with the gemcitabine control group in order to allow for a direct comparison of the anti-tumour efficacy between groups. The amount of total lipid injected was 1 mg/dose. Gemcitabine is administered intravenously at a dose of 1000 mg/m2 to treat pancreatic cancer in humans. The dose administered here is equivalent to 13.35 mg/m2 of gemcitabine being injected into humans; 1.33% of the clinical dose of gemcitabine in humans. In other studies, the amount of gemcitabine injected into mice in vivo studies has ranged from 7-100 mg/kg.

Figure 8:
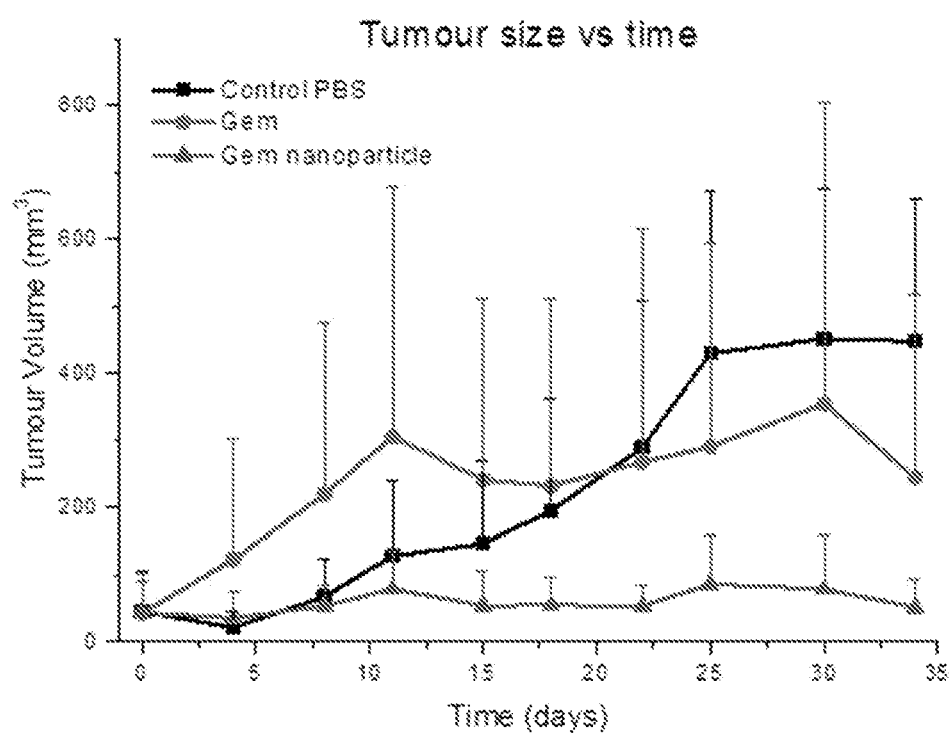
FIG. 8: Tumour inhibition of Gemcitabine amphiphile nanoparticles (Gem-phytanyl/DMPC/cholesterol:18.38/70.52/8.10 w %) compared with Gemcitabine drug and PBS control groups.

30 mice were used in the study; however, data analysis was conducted on 29 mice as 1 mice in the saline control group failed to grow a tumour. Therefore, the control group had 9 mice, the gemcitabine group had 10 mice, the Gem amphiphile phospholipid/cholesterol nanoparticles group had 10 mice Raw tumour volume was graphed over time and displayed in FIG. 8. The control mice treated with saline alone had a large growth in tumour size over time while the mice treated with native gemcitabine and Gem amphiphile phospholipid/cholesterol nanoparticles demonstrated a decrease in tumour size over time. Tumour volumes of the mice treated with native gemcitabine were 54% of control tumour size while the tumour volumes of the mice treated with the Gem amphiphile phospholipid/cholesterol nanoparticles was 11% of the control tumour size respectively. The general trend therefore shows that tumours in the control group increased in size; tumours treated with Gemcitabine increased in size, however at a slower rate compared with the control PBS group, and tumours treated with Gem amphiphile phospholipid/cholesterol nanoparticles did not substantially increase in size.

Considering the relatively low dose used in the current experiment, a larger dose of gemcitabine would be ideal, however the limiting factor was a combination of the volume injected into the mice, Gem nanoparticle concentration. The stock solution of the Gem nanoparticles was made to 5 mg/mL. Due to the limitation of the injection volume, a stock solution of >30 mg/mL is required, but dispersions more than 10 mg/mL were not stable and resulted in the Gem nanoparticles precipitating out of solution.

Figure 9:
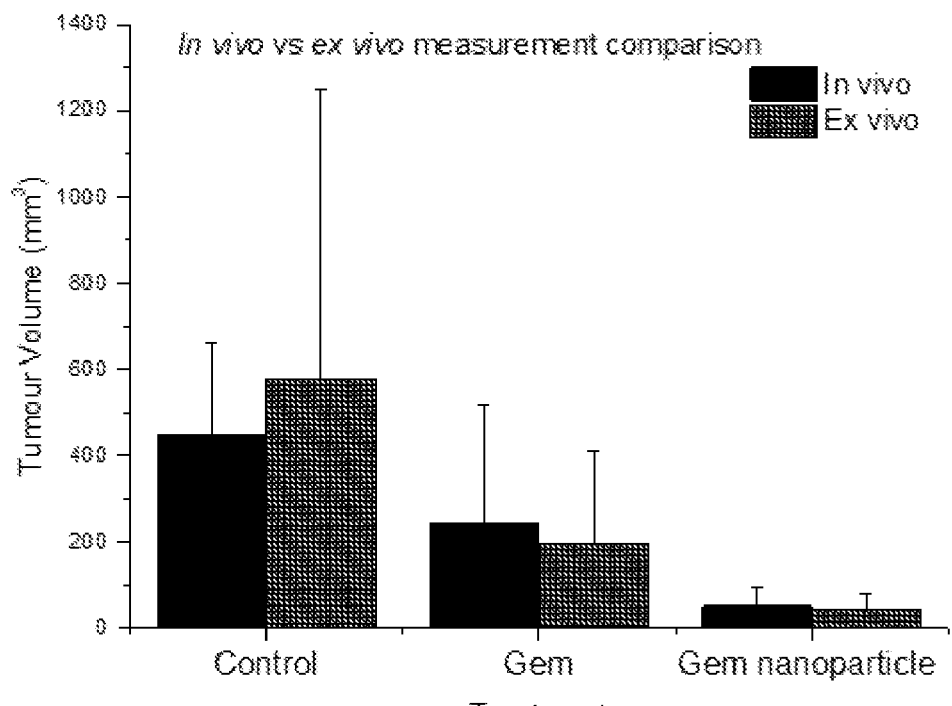
FIG. 9: Average ex-vivo tumour weight of tumours treated with Gemcitabine amphiphile nanoparticles (Gem-phytanyl/DMPC/cholesterol:18.38/70.52/8.10 w %), Gemcitabine drug, and PBS control.
Figure 9:
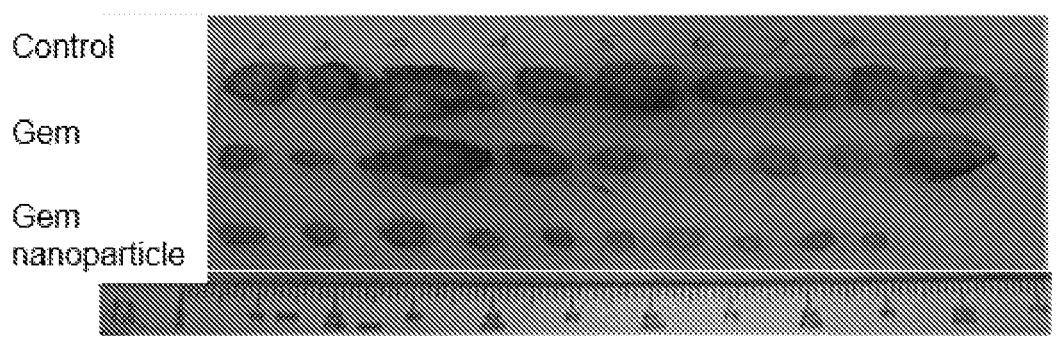

At the end of the study, the tumours were harvested. A general trend by visual inspection suggested that based on average tumour size the control group>gemcitabine>Gem nanoparticles. The tumours were weighed and it was determined that the control mice had the greatest average weight, followed by mice treated with gemcitabine and lastly by the tumours treated with the Gem nanoparticles (FIG. 9). The general trend therefore shows an increase in tumour weight in the order: control group>Gemcitabine group>Gemcitabine nanoparticles (Gem-phytanyl/DMPC/cholesterol:18.38/70.52/8.10 w %). Statistical significance was observed between the control group tumours and Gemcitabine nanoparticles; Pairings indicate statistical significance ($p<0.05$).

Example 16: Biodistribution of Gem-Nanoparticles

Figure 10:
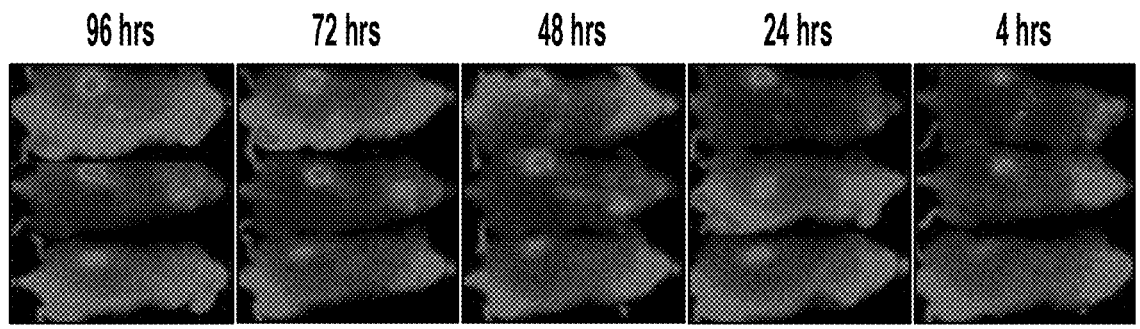
FIG. 10: Biodistribution of fluorescent Gemcitabine amphiphile nanoparticles (Gem-phytanyl/DMPC/cholesterol/DiD fluorescent lipid:18.38/70.52/7.10/1 w %) in NOD/SCID mice: (a) whole body after 4, 24, 48, 72 and 96 hrs time periods; (b) distribution in various organs excised after culling the mice. The excitation and emission wavelengths were 650 nm and 700 nm.
Figure 10:
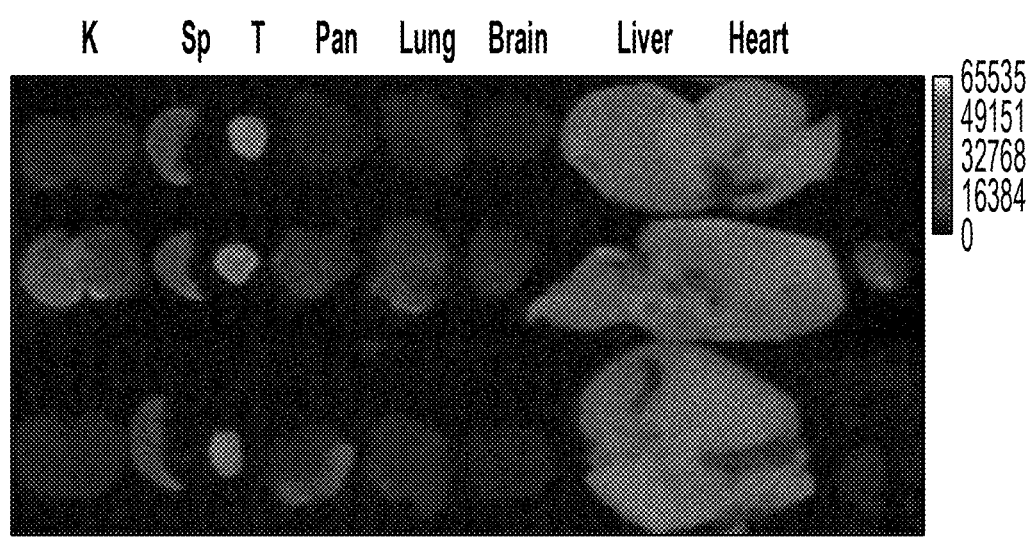

Mice were injected with fluorescent-labelled Gem-amphiphile phospholipid/cholesterol nanoparticles (Gem-phytanyl/DMPC/cholesterol/DiD' fluorescent lipid: 18.38/70.52/7.10/1 w %) in order to elucidate their biodistribution in vivo. The mice were imaged at 4, 24, 48, 72 and 96 hour time periods using a Carestream fluorescent imager (FIG. 10). The results show an accumulation of the fluorescent Gem-nanoparticles in the tumour. A small amount of autofluorescence was observed in the ears and leg. The intensity/area of the fluorescence was quantified using ImageJ and these values were graphed (Maximum intensity was achieved after 72 hours, suggesting that circulation continued for 72 hours before finally accumulating in the tumour. After this period, the amount of fluorescence tapered off. The ex vivo distribution indicated that the biological fate of Gem-nanoparticles was predominantly in the tumour and liver. And that Gem-nanoparticles were able to enter the tumour efficiently (passive targeting).

Example 17: In Vivo Tumour Inhibition in Colorectal Cancer Xenograft Model

Figure 11:
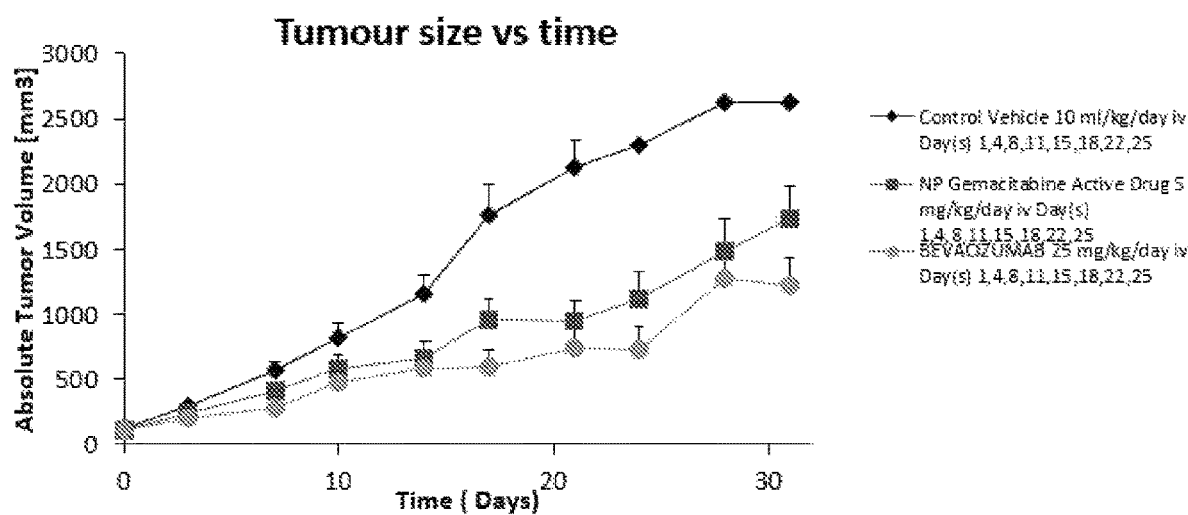
FIG. 11: Tumour inhibition of Gemcitabine-amphiphile nanoparticles (Gem-oleyl/DOPC/PEG4000-oleoyl 26/60.8/13.2 w %) in a PDX CXF260 xenograft model in nude mice versus Avastin.

In a separate independent test, a Gem-oleyl-DOPC nanoparticle was tested on a colorectal cancer Xenograft model, shown in FIG. 11. The four groups on this set of experiments were, the prodrug nanoparticles at 5 mg/Kg/dose active drug, a control nanoparticle without the prodrug and Bevacizumab (Avastin). The NPs was used at a low dose ~1/10 of the dose of Gemcitabine normally used in a mice tumour model. The Avastin was used at a high dose of 25 mg/Kg/dose, which is nearly 10 times more than usual dose in mice experiments. The results shows that the Gem nanoparticles at a very low level, 10 fold lower dose than clinical dose, inhibited the tumour growth efficiently to a level that was not significantly less than that at a high dose of 25 mg/Kg Avastin. The general trend shows that tumours in the control group increased in size, whereas the gemcitabine nanoparticle group inhibited the tumour growth at a fraction of the clinical dose of Gemcitabine (4 mg/Kg).

Figure 12:
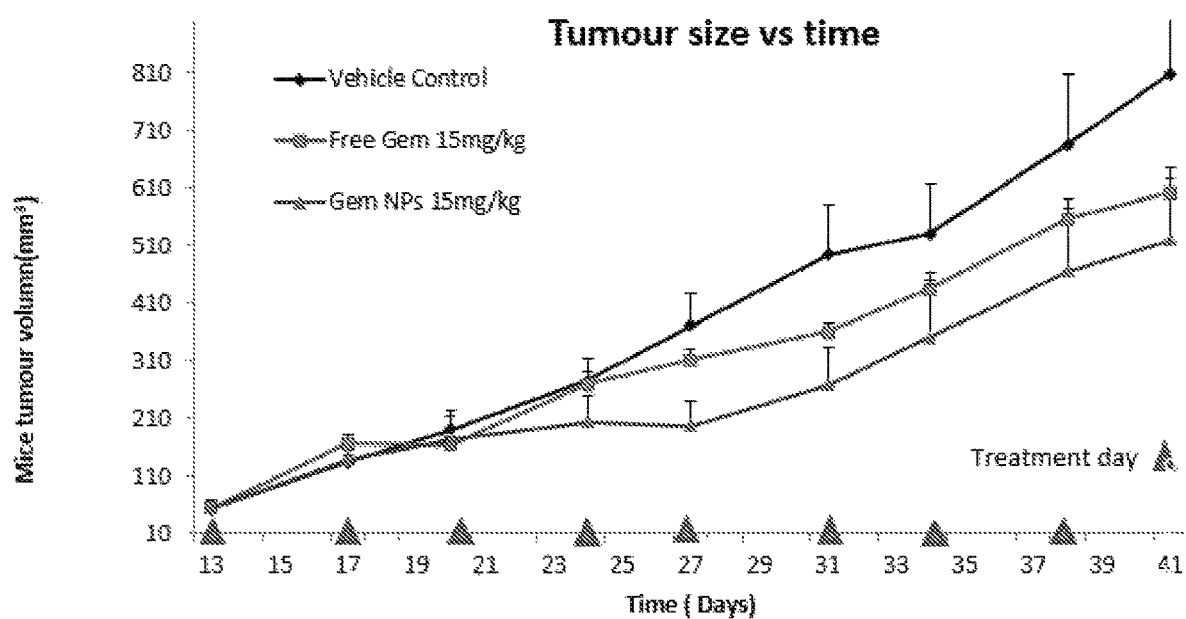
FIG. 12: Tumour inhibition of Gemcitabine amphiphile nanoparticles (Gem-PEG$_3$-oleoyl/phospholipid/cholesterol in 6/9/1 w %+Peg4K-oleoyl (15% of the total lipid weight). The nanoparticle dispersion contained 15 mg/Kg of active Gemcitabine compared with 15 mg/Kg Gemcitabine drug, and control PBS tested in a Mia paca2 pancreatic cancer xenograft model.

Example 18: In Vivo Tumour Inhibition in Mia paca2 Pancreatic Cancer Xenograft Model In a separate test, a Gem-$PEG_3$-Oleoyl/DMPC/cholesterol nanoparticle was tested on a highly resistant Mia paca2 pancreatic cancer Xenograft model, shown in FIG. 12. The three groups on this set of experiments were: the Gem nanoparticles at 15 mg/Kg/dose active Gemcitabine, Gemcitabine drug solution at 15 mg/Kg/dose and control PBS group.

The result shows that prodrug nanoparticle group inhibited the tumour growth more efficiently than Gemcitabine and significantly better than PBS. Although the tumour growth in this very resistant pancreatic cancer xenograft was not completely inhibited, the growth rate was slowed with the prodrug nanoparticle compared to Gemcitabine at similar dose.

REFERENCES

1) Matsumura Y, Maeda H. A New Concept for Macromolecular Therapeutics in Cancer Chemotherapy: Mechanism of Tumoritropic Accumulation of Proteins and the Antitumor Agent Smancs. Cancer Research. 1986; 46(12 Part 1):6387-92

2) Barenholz Y. Doxil(R)—the first FDA-approved nanodrug: lessons learned. Journal of controlled release: official journal of the Controlled Release 3) Drummond C. J, Sagnella S. M., Moghaddam M. J, Gong, X, Amphiphile prodrugs, U.S. Pat. No. 8,603,999B2.

4) Couvreur P., Stella B., Cattel L., Rocco F., Renoir J. M. Rosillo V, Gemcitabine derivatives nanoparticles, US20090130214A1.

5) Yangab S. C., Lub, L. F., Caic Y., Ahub, J. B. Liangc B. W., Yanga Z., Body distribution in mice intravenously injected camptothecin solid lipid nanoparticles and targeting effect on brain. Journal of controlled release, 1999, 3, 299-307.

6) Jin Y., Tong L, Ai P., Li M. and Hou X. Self-assembled drug delivery systems 1. properties and in vitro/in vivo behaviour of acyclovir self-assembled nanoparticles (SAN), International Journal of Pharmaceutics, 2006, 309: 199-207

7) Brannon-Peppas L. Blanchtte J. O., Nanopartiles and targeted systems for cancer therapy, Adv drug delivery reviews, 2012, 64, 206-212

8) Mehnert W., Maeder K., Solid lipid nanoparticles: production, characterisation and applications, Adv drug selivery rev. 2001, 472-3):165-96

9) Jin, et al. 2005. Colloid. Surf. B Biointerfaces 42, 45-51

The claims defining this invention are as follows:
1. A composition, comprising an aqueous solvent and a prodrug of formula (II'):

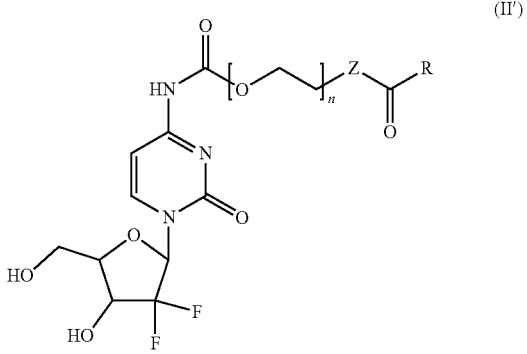

or 2'-deoxy-2',2'-difluoro-N4-(((3, 7, 11, 15-tetramethyl-hexadecyl)oxy)carbonyl) cytidine (Gem-Phytanyl);
in which Formula (II'):
R is selected from a group consisting of oleoyl, oleoylamide, linoleoyl, linoleoylamide, linolenoyl, linolenoylamide, arachidonoyl, arachidonoylamide, phytanoyl, phytanoylamide, hexahydrofarnesoyl, and hexahydrofarnesoylamide;
Z is O or NH; and
n=1-10;
wherein the composition has a form of a self-assembled bulk lyotrophic liquid crystalline mesophase, under physiological conditions in which the temperature is 35° C. to 37° C., and wherein the self-assembled bulk lyotrophic liquid crystalline mesophase is selected from the group consisting of a liquid crystalline lamellar phase, an inverse bicontinuous cubic phase, an inverse hexagonal phase, a sponge phase, and combinations thereof; or
wherein the composition has a form of colloidosomes formed from colloidal nanoparticles that possess an internal nanostructure of a self-assembled bulk lyotrophic liquid crystalline mesophase, under physiological conditions in which the temperature is 35° C. to 37° C., and wherein the self-assembled bulk lyotrophic liquid crystalline mesophase is selected from the group consisting of a liquid crystalline lamellar phase, an inverse bicontinuous cubic phase, an inverse hexagonal phase, a sponge phase, and combinations thereof, and wherein the colloidal nanoparticles have an average size ranging from 10 to 1,000 nm.

2. The composition according to claim 1, wherein R is selected from the group consisting of: oleoyl, oleoylamide, linoleoyl, linoleoylamide, linolenoyl, linolenoylamide, arachidonoyl, and arachidonoylamide.

3. The composition according to claim 1, wherein R is selected from the group consisting of: phytanoyl, phytanoylamide, hexahydrofarnesoyl, and hexahydrofarnesoylamide.

4. The composition according to claim 1, wherein R is selected from the group consisting of: oleoyl, oleoylamide, linoleoyl, linoleoylamide, linolenoyl, linolenoylamide, arachidonoyl, and arachidonoylamide, and
wherein the composition has the form of the self-assembled bulk lyotrophic liquid crystalline mesophase.

5. The composition according to claim 2, wherein n=3-6.

6. The composition according to claim 1, wherein R is selected from the group consisting of: oleoyl, oleoylamide, linoleoyl, linoleoylamide, linolenoyl, linolenoylamide, phytanoyl, and phytanoylamide, and
wherein the composition has the form of the colloidosomes formed from the colloidal nanoparticles that possess the internal nanostructure of the self-assembled bulk lyotrophic liquid crystalline mesophase.

7. The composition according to claim 1, wherein the prodrug of Formula (II') is 2'-deoxy-2',2'-difluoro-N4-(((3, 7, 11, 15-tetramethyl-hexadecyl)oxy)carbonyl) cytidine (Gem-Phytanyl).

8. The composition according to claim 3, wherein R is selected from the group consisting of: phytanoyl, phytanoylamide, hexahydrofarnesoyl, and hexahydrofarnesoylamide, and
wherein the composition has the form of the colloidosomes formed from the colloidal nanoparticles that possess the internal nanostructure of the self-assembled bulk lyotrophic liquid crystalline mesophase.

9. The composition according to claim 1, wherein the composition has the form of the self-assembled bulk lyotrophic liquid crystalline mesophase, and
wherein the mesophase is selected from the group consisting of: the liquid crystalline lamellar phase, the inverse bicontinuous cubic phase, the hexagonal phase, the sponge phase, and the combinations thereof.

10. The composition according to claim 1, wherein the composition has the form of the self-assembled bulk lyotrophic liquid crystalline mesophase, and
wherein the mesophase is selected from the liquid crystalline lamellar phase, the inverse bicontinuous cubic phase, and the combinations thereof.

11. The composition according to claim 1, further comprising a component selected from the group consisting of: a phospholipid, a cholesterol, a glycerol lipid, a prodrug amphiphile, and combinations thereof.

12. The composition according to claim 1, wherein the colloidal nanoparticles have an average size ranging from 10 to 200 nm.

13. The composition according to claim 1, wherein the prodrug is selected from the group consisting of
2'-deoxy-2',2'-difluoro-N4-(((3,7,11,15-tetramethyl-hexadecyl)oxy)carbonyl) cytidine,
2'-deoxy-2',2'-difluoro-N4-((((cis-9, octadecenoyl)-oxy-hexaethyleneglycol)oxy)carbonyl) cytidine,
2'-deoxy-2',2'-difluoro-N4-((((cis-9, 12, 15 octadecatrienoyl)-oxy-hexaethyleneglycol)oxy)carbonyl) cytidine, and
2'-deoxy-2',2'-difluoro-N4-((((cis-9, octadecenoyl)amino-triethyleneglycol)oxy)carbonyl) cytidine.

14. The composition according to claim 1, wherein the prodrug is of Formula (II').

15. The composition according to claim 14, wherein n=3-6.

16. The composition according to claim 15, wherein R is selected from the group consisting of: oleoyl, oleoylamide, linoleoyl, linoleoylamide, linolenoyl, linolenoylamide, phytanoyl, and phytanoylamide, and
wherein the composition has the form of the colloidosomes formed from the colloidal nanoparticles that possess the internal nanostructure of the self-assembled bulk lyotrophic liquid crystalline mesophase.

17. The composition according to claim 14, wherein R is selected from the group consisting of: oleoyl, oleoylamide, linleoyl, linoleoylamide, linolenoyl, linolenoylamide, phytanoyl, and phytanoylamide, and
wherein the composition has the form of the self-assembled bulk lyotrophic liquid crystalline mesophase.

18. The composition according to claim 3, wherein the composition has the form of the self-assembled bulk lyotrophic liquid crystalline mesophase.

\* \* \* \* \*